United States Patent [19]
Kanazawa et al.

[11] Patent Number: 5,431,141
[45] Date of Patent: Jul. 11, 1995

[54] ELECTRONIC THROTTLE SYSTEM

[75] Inventors: Hiroshi Kanazawa, Hitachi; Fumio Tajima, Ibaraki; Yasuhiko Honda, Ibaraki; Yasushi Sasaki, Ibaraki; Teruhiko Minegishi; Yoshikatu Hashimoto, both of Katsuta; Tatsuya Yoshida, Ibaraki; Yuzo Kadomukai, Ishioka, all of Japan

[73] Assignees: Hitachi, Ltd., Tokyo; Hitachi Automotive Engineering Co., Ltd., Ibaraki, both of Japan

[21] Appl. No.: 86,210

[22] Filed: Jul. 6, 1993

[30] Foreign Application Priority Data

Jul. 16, 1992 [JP] Japan .................. 4-189749

[51] Int. Cl.6 ............................ F02D 9/02
[52] U.S. Cl. ...................... 123/399; 123/337; 310/103
[58] Field of Search .......... 123/399, 361, 337; 310/67 R, 103, 105, 68 B, 191, 193, DIG. 3

[56] References Cited

U.S. PATENT DOCUMENTS

| | | | |
|---|---|---|---|
| 4,892,071 | 1/1990 | Asayama | 123/399 |
| 5,002,032 | 3/1991 | Kolberg | 123/399 |

FOREIGN PATENT DOCUMENTS

| | | |
|---|---|---|
| 0300479 | 1/1989 | European Pat. Off. . |
| 3814702 | 5/1989 | Germany . |
| 3811892 | 10/1989 | Germany . |
| 59-226244 | 12/1984 | Japan .................. 123/399 |
| 1-151733 | 6/1989 | Japan . |
| 1-301934 | 12/1989 | Japan . |
| 2-27123 | 1/1990 | Japan . |
| 2-55842 | 2/1990 | Japan . |

Primary Examiner—Noah P. Kamen
Attorney, Agent, or Firm—Evenson, McKeown, Edwards & Lenahan

[57] ABSTRACT

On one side of a valve shaft, there are provided an accelerator drum connected to an accelerator pedal by an accelerator wire, a return spring for urging the accelerator drum in a valve closing direction, and an accelerator sensor for detecting rotation of the accelerator drum and transmitting a detected signal to a host system. On the other side of the valve shaft, there are provided a large-diameter gear and an opening sensor. An armature of a solenoid clutch is attached to the gear and held on a motor shaft via a slide bearing. Thus, the motor, the solenoid clutch and the throttle valve are arranged into a U-shaped form for interconnection through four gears.

7 Claims, 20 Drawing Sheets

FIG. 7
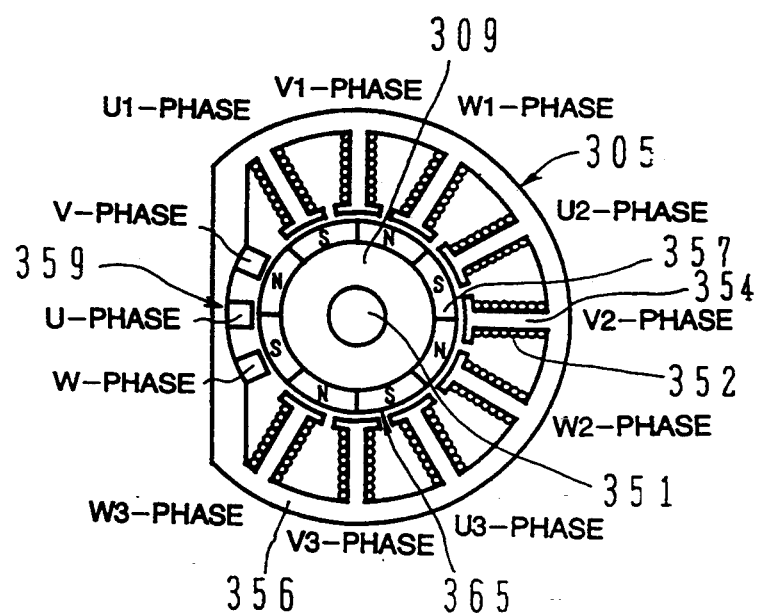
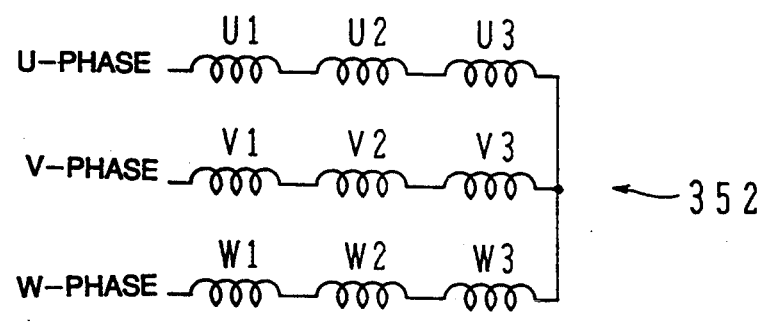

FIG.12-

ELECTRONIC THROTTLE SYSTEM

BACKGROUND OF THE INVENTION

The present invention relates to a structure of an electronic throttle system for controlling air intake in internal combustion engines.

The following five prior arts are known relating to arrangement of a valve shaft, an motor, a clutch, etc. in the conventional structure of a throttle body.

1. Cooling type throttle actuator (JP A 2-55842)

A coolant passage line is provided inside a motor to provide a positive cooling effect at all times regardless of engine operating condition.

2. Throttle actuator (JP A 59-226244)

A drive motor, a solenoid clutch mechanism, a return spring for restoring a throttle valve, and a photo-encoder for detecting rotation of a throttle shaft are housed into a one-piece structure for a reduction in size.

3. Throttle controller (JP A 2-27123)

Components such as an operation lever and a control lever are dispersedly arranged at one end and the other end of a throttle body for a reduction in size, and a lost motion spring is provided to keep the operation lever from being affected by control of an motor.

4. Device for operating throttle valve of internal combustion engine (JP A 1-15173)

A solenoid clutch is provided between a motor output shaft and a throttle valve shaft. The solenoid clutch is connected during normal operation and disconnected in failure of a controller and upon cut-off of a motor current, so that emergency travel operation is enabled without using any expensive logic circuit for safety.

5. Device for controlling vehicular internal combustion engine (JP A 1-301934)

A solenoid coupling is provided to completely disconnect an accelerator lever from a throttle valve during normal operation, thereby eliminating an influence of torque on a servo motor.

SUMMARY OF THE INVENTION

The above-cited prior arts, however, have problems below.

In the first prior art, the motor and the valve shaft are arranged in a line. In the second prior art, the throttle shaft, the solenoid clutch and the motor are arranged along the same axis. This means a difficulty in reducing a actuator size in the direction of the throttle shaft.

In the third to fifth prior arts, the motor and the throttle shaft are arranged into a U-shaped form to enable a size reduction in the direction of the throttle shaft. But in the third prior art, because the clutch is provided on the clutch shaft rather than the motor shaft and the throttle shaft, a size reduction is limited in a direction perpendicular to the throttle shaft. In the fourth and fifth prior arts, because the clutch is disposed on the throttle shaft, larger transmission power is required than the case of the clutch being disposed on the motor shaft and the clutch diameter is increased correspondingly to thereby limit a size reduction in a direction perpendicular to the throttle shaft as well as a weight reduction of the actuator. In any case, a difficulty is encountered in reducing the size and weight of the actuator.

An object of the present invention is to provide an electronic throttle system capable of a reduction in size and weight.

To achieve the above object, in accordance with the present invention, there is provided an electronic throttle system comprising: an electronically controlled throttle actuator for controlling air intake, the electronically controlled throttle actuator including a throttle valve, a motor for generating torque to operate the throttle valve, gears for transmitting the torque generated by the motor, and a clutch for connecting and disconnecting transmission of the torque; and control means for controlling the electronically controlled throttle actuator, wherein the motor and the throttle valve are arranged into a U-shaped form for interconnection through the gears, and the clutch is disposed on the same side as the motor so as to axially align therewith.

In the above electronic throttle system, preferably, the motor is of a brushless motor and a part of a magnetic circuit for the brushless motor is used as a part of a magnetic circuit for the clutch.

In the above electronic throttle system, preferably, the motor is of a brushless motor having a substantially semicircular cross-section comprising a portion generating torque and a flattened portion generating no torque and magnetic pole sensors for detecting positions of magnetic poles of the brushless motor are disposed in the flat portion.

In the above electronic throttle system, preferably, a control circuit provided in the control means for controlling the motor is disposed in a case integrally molded with a case housing the motor therein.

Also to achieve the above object, in accordance with the present invention, there is provided an electronic throttle system comprising: an electronically controlled throttle actuator for controlling air intake, the electronically controlled throttle actuator including a throttle valve, a brushless motor for generating torque to operate the throttle valve; and control means for controlling the electronically controlled throttle actuator, wherein the brushless motor is incorporated in a shaft of the throttle valve.

Further to achieve the above object, in accordance with the present invention, there is provided an electronic throttle system comprising: an electronically controlled throttle actuator for controlling air intake, the electronically controlled throttle actuator including a throttle valve, a brushless motor for generating torque to operate the throttle valve; and control means for controlling the electronically controlled throttle actuator, wherein the brushless motor comprises first salient poles having coils wound over the same and second salient poles having no coils and magnetic pole sensors for detecting positions of magnetic poles of the brushless motor.

In the above electronic throttle system, preferably, the magnetic pole sensors are disposed at positions shifted from the centers of the second salient poles within the range of 30 degrees of electrical angle in a direction opposite to the direction of rotation of the brushless motor with which the throttle valve is opened.

Still further to achieve the above object, in accordance with the present invention, there is provided an electronic throttle system comprising: an electronically controlled throttle actuator for controlling air intake, the electronically controlled throttle actuator including a throttle valve, a brushless motor for generating torque to operate the throttle valve magnetic pole sensors for detecting positions of magnetic poles of the brushless motor, and an opening sensor for detecting a rotational position of the throttle valve; and control means for controlling the electronically controlled throttle actuator, wherein the control means has valve position control means for performing position control of the throttle valve based on first signals transmitted from the magnetic pole sensors and a second signal transmitted from the opening sensor.

In the above electronic throttle system, preferably, the valve position control means makes control for switching the first signals and the second signal at a predetermined boundary opening of the throttle valve to be selectively used such that the first signals and the second signal are switched over at different boundary openings between the opening direction and the closing direction of the throttle valve.

Still further to achieve the above object, in accordance with the present invention, there is provided an electronic throttle system comprising an electronically controlled throttle actuator for controlling air intake and control means for controlling the electronically controlled throttle actuator, the electronically controlled throttle actuator comprising a throttle valve and a brushless motor for generating torque to operate the throttle valve, wherein the brushless motor has a portion generating torque and a portion generating no torque, the brushless motor has a substantially semicircular cross-section with the portion generating no torque flattened, and magnetic pole sensors for detecting positions of magnetic poles of the brushless motor are disposed in the flat portion.

Still further to achieve the above object, in accordance with the present invention, there is provided an electronic throttle system comprising an electronically controlled throttle actuator for controlling air intake and control means for controlling the electronically controlled throttle actuator, the electronically controlled throttle actuator comprising a throttle valve and a motor for generating torque to operate the throttle valve, wherein a control circuit provided in the control means for controlling the motor is disposed in a case integrally molded with a case housing the motor therein.

According to the present invention thus arranged, the motor and the throttle valve are arranged into a U-shaped form for interconnection through the gears, whereby the electronic throttle system can be reduced in size and weight in a direction perpendicular to a valve shaft. Also, the clutch is disposed on the same side as the motor so as to axially align-therewith, i.e., on a motor shaft, which develops minimum transmission torque, whereby the clutch diameter can be reduced as compared with the conventional case of the clutch being disposed on the valve shaft, thus enabling a reduction in weight of the electronic throttle system. Further, the motor is held in contact with a throttle body which is always under cooling by the intake air, so that its cooling is promoted by thermal conduction. As a result, the motor size can be reduced relative to the prior art in which a large-size motor has been needed due to such a property that motor power is lowered to a larger extent under higher temperature conditions in use. Additionally, an abnormal operating condition such as a decrease in torque at high temperatures can be prevented.

With such an arrangement that the motor is of a brushless motor and a part of the magnetic circuit for the brushless motor is used as a part of the magnetic circuit for the clutch, the construction of the brushless motor and the clutch is simplified and the number of components is reduced. Consequently, the electronic throttle system can be reduced in size and weight.

With such an arrangement that the motor is of a brushless motor with a substantially semicircular cross-section which has a round portion generating torque and a flat portion generating no torque, and the magnetic pole sensors for detecting magnetic pole positions are disposed in the flat portion, the sectional area of the brushless motor is made smaller and the system size in a direction perpendicular to the valve shaft can be reduced. Also, there is no need of providing a separate space in which the magnetic pole sensors are to be disposed. Further, the flat portion including the magnetic pole sensors is held in contact with the throttle body which is always under cooling by the intake air, and its cooling is promoted by thermal conduction, whereby the magnetic pole sensors can operate in a stable manner and expensive heat-resistant magnetic pole sensors are no longer required, resulting in a reduced cost.

With such an arrangement that the control circuit provided in the control means for controlling the motor is disposed in the case integrally molded with the motor case, the number of wirings is reduced and wiring operation is simplified, enabling the electronic throttle system to be reduced in size and weight. This is also effective in reducing an influence of noise upon signal lines. Additionally, the control circuit is held in contact with the throttle body which is always under cooling by the intake air and, therefore, its cooling is promoted by thermal conduction.

Further, according to the present invention, the brushless motor is incorporated in the shaft of the throttle valve, thus making it possible to achieve a reduction in size and weight of not only the brushless motor but also the electronic throttle system. Furthermore, with the brushless motor disposed in a passage through which the intake air is always sucked to flow, cooling of the brushless motor is promoted.

Moreover, according to the present invention, the brushless motor has the first salient poles having the coils wound over the same and the second salient poles provided with no coils but the magnetic pole sensors, whereby a magnetic force generator which has been required to mount the magnetic pole sensors in the past can be eliminated. Therefore, the number of parts is reduced, the production cost is cut down, and the system size in the axial direction of the valve shaft can be achieved. Further, by utilizing a permanent magnet of the motor as a magnetic force generator for magnetic pole sensors, there is no need of separately providing such a magnetic force generator for the magnetic pole sensors, with the result of a reduction in the number of parts. Additionally, cooling of the magnetic pole sensors is promoted by thermal conduction to a stator.

With such an arrangement that the magnetic pole sensors are disposed at positions shifted from the centers of second salient poles within the range of 30 degrees of electrical angle in a direction opposite to the direction of rotation of the motor with which the throttle valve is opened, a response during high-speed rotation is improved without producing torque in the reversed direction during low-speed rotation. Accordingly, a smaller motor than conventional can be used to achieve the same response ability upon request, with the result of a reduction in size and weight of the electronic throttle system.

In addition, according to the present invention, the valve position control means provided in the control means performs position control of the throttle valve based on the first signals transmitted from the magnetic pole sensors and the second signal transmitted from the opening sensor, whereby large opening values which have been detected by an opening sensor in the prior art is detected by the magnetic pole sensors, and one opening sensor for the small opening range suffices in contrast with the prior art in which two opening sensors for the large and small opening ranges have been required. Therefore, it is possible to reduce the size and weight of the entire electronic throttle system, cut down the cost as a result of the reduced number of parts and further improve reliability. Additionally, large opening values are measured by the magnetic pole sensors, whereby the opening sensor is only used to detect small opening values and can have improved resolution.

Moreover, with such an arrangement that the valve position control means makes control for switching over the first signals and the second signal at a predetermined boundary opening to be selectively used, and the control switching is made at different boundary openings between the opening direction and the closing direction of the throttle valve, frequent control switching near the boundary opening at which the control mode is to be switched over can be prevented and the position control of the throttle valve can be stabilized.

Further, according to the present invention, the brushless motor has a substantially semicircular cross-section defined by a round portion generating torque and a flat portion generating no torque, and the magnetic pole sensors for detecting magnetic pole positions are disposed in the flat portion, the sectional area of the brushless motor is made smaller and the system size in a direction perpendicular to the valve shaft can be reduced. Also, there is no need of providing a separate space in which the magnetic pole sensors are to be disposed.

Additionally, according to the present invention, the control circuit provided in the control means for controlling the motor is disposed in the case integrally molded with a case housing the motor therein, the number of wirings is reduced and wiring operation is simplified, enabling the electronic throttle system to be reduced in size.

BRIEF DESCRIPTION OF THE DRAWINGS

FIG. 7 is a cross-sectional view of a half-round motor.

DETAILED DESCRIPTION OF THE PREFERRED EMBODIMENTS

A description will be hereinafter given of preferred embodiments of the present invention with reference to FIGS. 1 to 20.

A first embodiment of the present invention will be described by referring to FIGS. 1 to 3.

Figure 1:
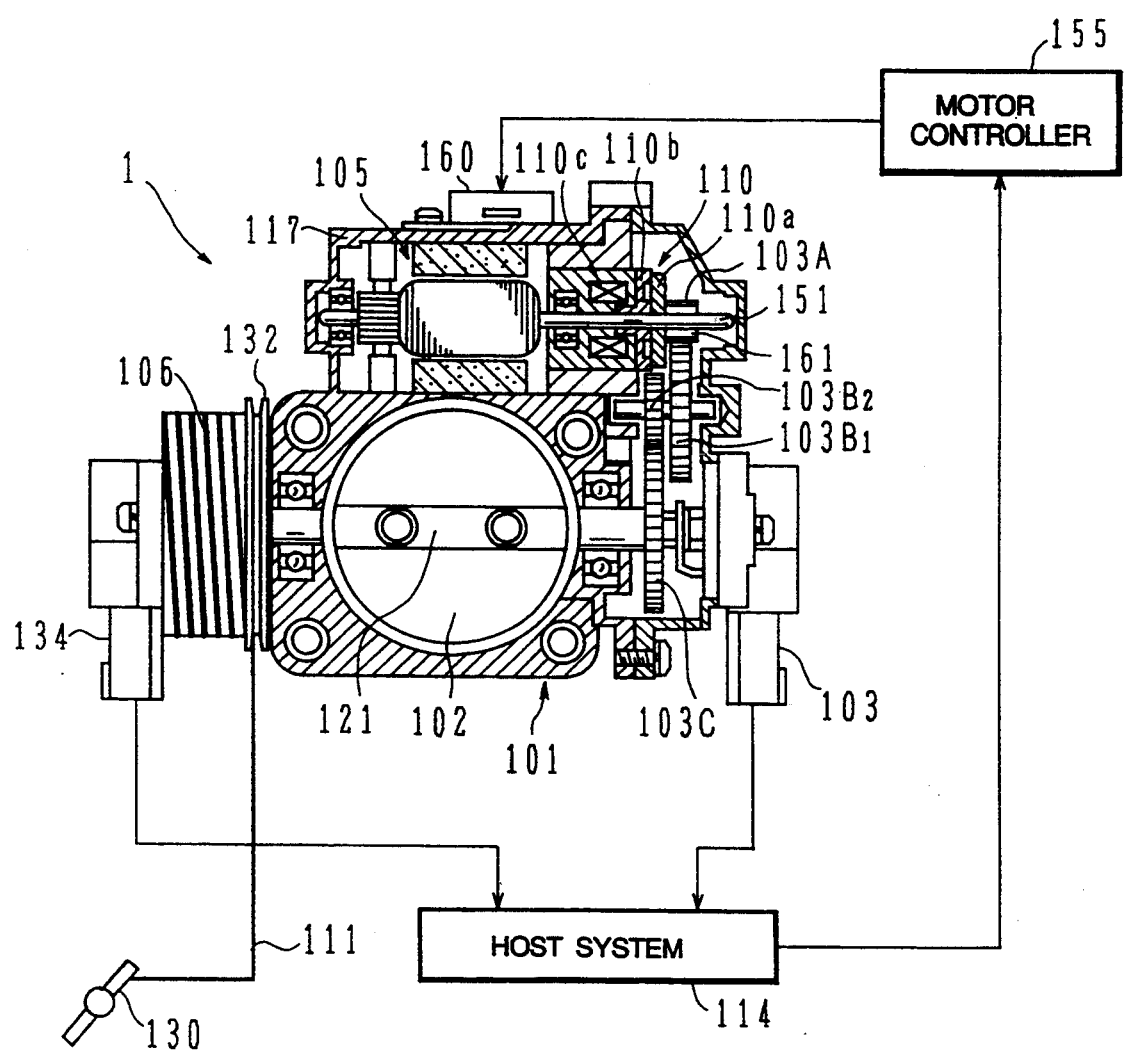
FIG. 1 is a view showing the entire construction of an electronic throttle system according to a first embodiment of the present invention.
Figure 2:
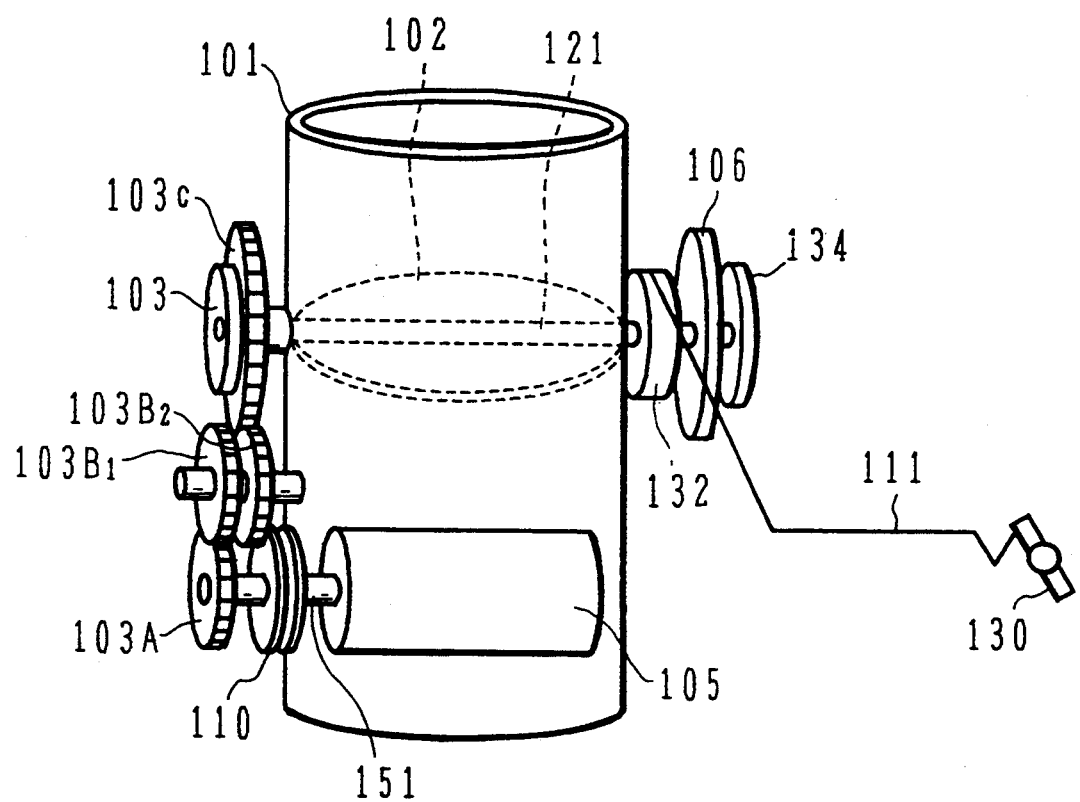
FIG. 2 is a view showing the entire construction of the electronic throttle system according to the first embodiment of the present invention.

FIGS. 1 and 2 show the entire construction of an electronic throttle system according to this embodiment. In FIGS. 1 and 2, the electronic throttle system includes an electronically controlled throttle actuator 1 comprising a throttle body 101 and a motor 105 provided adjacent to the throttle body 101 for generating torque to operate a throttle valve 102. The electronic throttle system also includes, as control means, a motor controller 155 for controlling rotation of the motor 105 and a host system 114 for carrying out, in concentrated fashion, not only general control of the electronic throttle system but also control of other parts of an automobile such as an air conditioner.

The throttle body 101 comprises a throttle valve 102 for controlling a flow rate of intake air, and a valve shaft 121 disposed at the center of the throttle valve 102. On one side of the valve shaft 121, there are provided an accelerator drum 132 coupled thereto via a control lever (described later) and a lost motion spring (described later), a return spring 106 for urging the accelerator drum 132 in a closing direction of the throttle valve 102, and an accelerator sensor 134 for detecting rotation of the accelerator drum 132 and transmitting a detected signal to the host system 114. The accelerator drum 132 is connected to an accelerator pedal 130 by an accelerator wire 111.

On the other side of the valve shaft 121, there are provided a large-diameter gear 103C and an opening sensor 103. The gear 103C is in mesh with a gear 103B2 on an intermediate shaft, and another gear 103B1 on the same shaft as the gear 103B2 is in mesh with a gear 103A on a motor shaft 151. Thus, as shown, the motor 105 and the throttle valve 102 are arranged into a U-shaped form for interconnection through those four gears 103A to 103C. A total gear ratio given by those four gears 103A to 103C is 24:1 at which the torque of the motor 105 is transmitted to the valve shaft 121.

Attached to the gear 103A is a movable rotor (armature) 110a of a solenoid clutch 110 for connecting and disconnecting transmission of the torque, the gear 103A and the armature 110a being held on the motor shaft 151 through a slide bearing 161. Another rotor (clutch rotor) 110b of the solenoid clutch 110 is disposed facing the armature 110a with a slight gap left therebetween. When a current is supplied to a coil 110c of the solenoid clutch 110, the armature 110a is attracted to come into close contact with the clutch rotor 110b.

The motor 105 is of a DC motor and housed in a motor case 117. The motor case 117 is arranged in such a manner as to contact at its one side with an outer circumference of the throttle body 101. The motor shaft 151 includes a rotor over which windings are coiled, and a commutator. The stator side includes a magnetic field generator in the form of a permanent magnet and a brush for rectification. A housing of the motor 105 is provided with a connector 160 to which is connected a power supply line leading from the motor controller 155 to the motor 105 and the solenoid clutch 110.

Applied to the host system 114 are a signal of an accelerator sensor 134, a signal of the opening sensor 103, and other signals of not-shown sensors indicating automobile conditions such as engine status, road conditions, rotational speeds of tires, and a battery voltage. The host system 114 outputs a signal for rotating the motor 105 to the motor controller 155.

The structure and functions of those components relating to operation of then electronically controlled throttle actuator 1 will be described with reference to FIG. 3.

Figure 3:
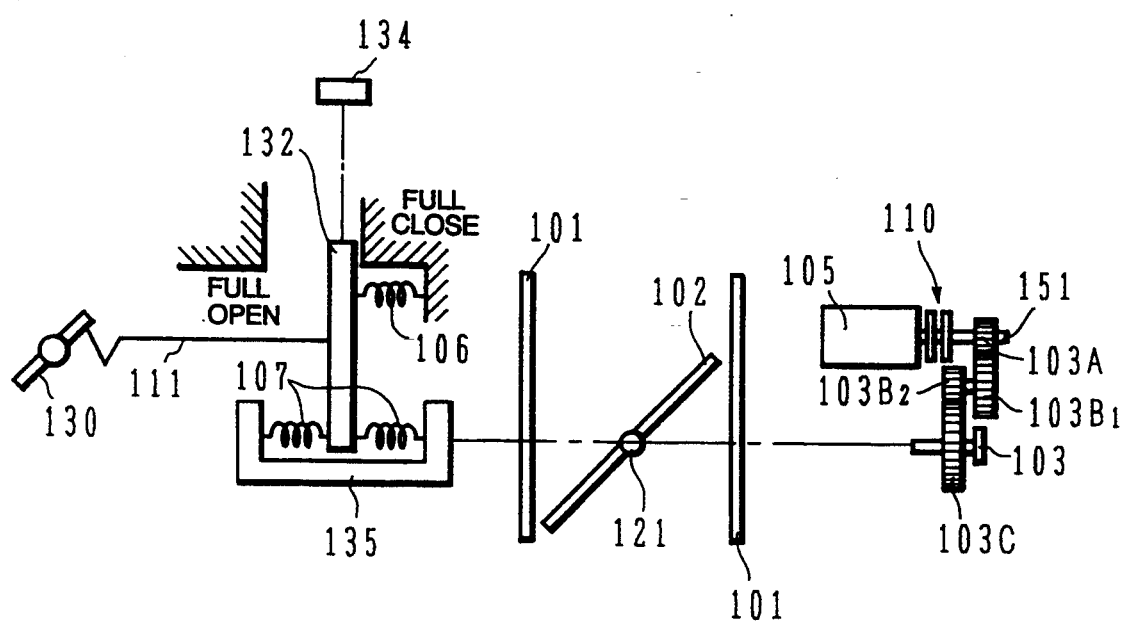
FIG. 3 is a view showing the structure and functions of those components relating to operation of an electronically controlled throttle actuator.

In FIG. 3, a control lever 135 is directly coupled to on end of the valve shaft 121 of the throttle valve 102, and the accelerator drum 132 is connected to the center of the control lever 135 through two lost motion springs 107, 107 each on either side. The return spring 106 is disposed between the accelerator drum 132 and the throttle body 101 for urging the accelerator drum 132 in the closing direction (to the right in the drawing) of the throttle valve 102. The accelerator pedal 130 and the accelerator drum 132 are directly coupled to each other by the accelerator wire 111 so that when a driver treads on the accelerator pedal 130, there produces a force pulling the accelerator drum 132 in an opening direction of the throttle valve 102 (to the left in the drawing).

Operation of the electronic throttle system of this embodiment shown in FIGS. 1 to 3 will now be described.

In FIGS. 1 to 3, when the driver treads on the accelerator pedal 130, the accelerator drum 132 is rotated in the valve opening direction and a corresponding tread angle of the accelerator pedal 130 is output to the accelerator sensor 134. Based on a signal delivered from the accelerator sensor 134, the host system 114 outputs a control command to the motor controller 155 for rotating the motor 105. During normal operation, the solenoid clutch 110 is kept turned on, causing the torque of the motor 105 to be transmitted to the valve shaft 121 through the solenoid clutch 110 and the gears 103A, B1, B2 and C. At this time, the host system 114 continuously outputs a control command to the motor controller 155 so that the signal output from the opening sensor 103 directly coupled to the valve shaft 121 and the signal output from the accelerator sensor 134 are coincident with each other. As a result, the throttle valve 102 is opened to a predetermined opening corresponding to the tread angle of the accelerator pedal 130.

While the throttle valve 102 is rotated by driving of the motor 105 from one side, the opposite side of the throttle valve 102 is directly coupled to the control lever 135, and the accelerator drum 132 and the accelerator pedal 130 are directly coupled to each other by the accelerator wire 111. With the control lever 135 and the accelerator drum 132 coupled to each other through the two lost motion springs 107, 107, however, some degree of difference is allowed between operation of the control lever 135 and operation of the accelerator drum 132. Accordingly, as described below, an opening of the throttle valve 102 can be forcibly controlled from the side of the motor 105 within a certain extent regardless of the tread amount of the accelerator pedal 130.

More specifically, when the tire happens to slip, for example, output torque of an engine must be reduced because the engine output torque is larger than friction torque originating from the road surface. The host system 114 detects a tire slip from comparison between a rotational speed of the tire and a vehicle speed, and provides the motor controller 155 with a command for closing the throttle valve 102, whereby the amount of air sucked to the engine is reduced to lower the engine output torque. At this time, even when the driver treads on the accelerator pedal 130 and the accelerator drum 132 is rotated in the valve opening direction (to the left in FIG. 3), the throttle valve 102 can be forcibly rotated in the valve closing direction only by rotation of the motor 105 regardless of the position of the accelerator pedal 130, since the control lever 135 is movable in the valve closing direction (to the right in FIG. 3) as far as such a movement is allowed by the lost motion springs 107.

While the above description is related to operation in TCS (Traction Control System), other control such as ISC (Idle Speed Control) and ASCD (Auto Speed Control Device) can also be performed in a like manner.

In the event of an abnormal condition such as when the motor 105 is failed, the solenoid clutch 110 is turned off and the opening of the throttle valve 102 is mechanically adjusted by the accelerator pedal 130 via the accelerator wire 111, the accelerator drum 132 and the control lever 135. In other words, when the driver treads on the accelerator pedal 130, the accelerator drum 132 is rotated in the valve opening direction. As mentioned above, the accelerator drum 132 and the control lever 135 are connected to each other through the two lost motion springs 107, 107 with a certain allowable range of relative movement. In a range beyond that allowable range, however, mechanical interconnection is established between the accelerator drum 132 and the control lever 135, hence the control lever 135 is also urged in the valve opening direction so that the throttle valve 102 is rotated in the valve opening direction. By fully treading on the accelerator pedal 130, for example, the throttle valve 102 can be opened to about a half of the full stroke.

With this embodiment, as described above, since the motor 105 and the throttle valve 102 are arranged into the U-shaped form for interconnection through the gears 103A to 103C, the electronic throttle system can be reduced in size and weight in a direction perpendicular to the valve shaft 121. Also, since the solenoid clutch 110 is disposed on the same side as the motor 105 so as to axially align therewith, i.e., on the motor shaft 151, which develops minimum transmission torque, the clutch diameter can be reduced by an amount corresponding to the gear ratio (24:1 in this embodiment) as compared with the conventional case of the clutch being disposed on the valve shaft 121, thus enabling a reduction in size and weight of the electronic throttle system. As a result, it becomes easy to install the electronic throttle system in a narrow engine room. In addition, power supply lines for the solenoid clutch 110 and the motor 105 can be placed together at one location.

Further, since the motor 105 is held in contact with the throttle body 101 which is always under cooling by the intake air, its cooling is promoted by thermal conduction. Accordingly, the motor size can be reduced relative to the prior art in which a large-size motor has been needed due to such a property that motor power is lowered to a larger extent under higher temperature conditions in use. Additionally, an abnormal operating condition such as a decrease in torque at high temperatures can be prevented.

While the above embodiment has been explained in connection with the case of the motor 105 being of a DC motor, for example, the present invention is also applicable to the case of using a brushless motor with the result of a similar advantages.

The case of using a brushless motor will be described below as a second embodiment of the present invention by referring to FIG. 4.

Figure 4:
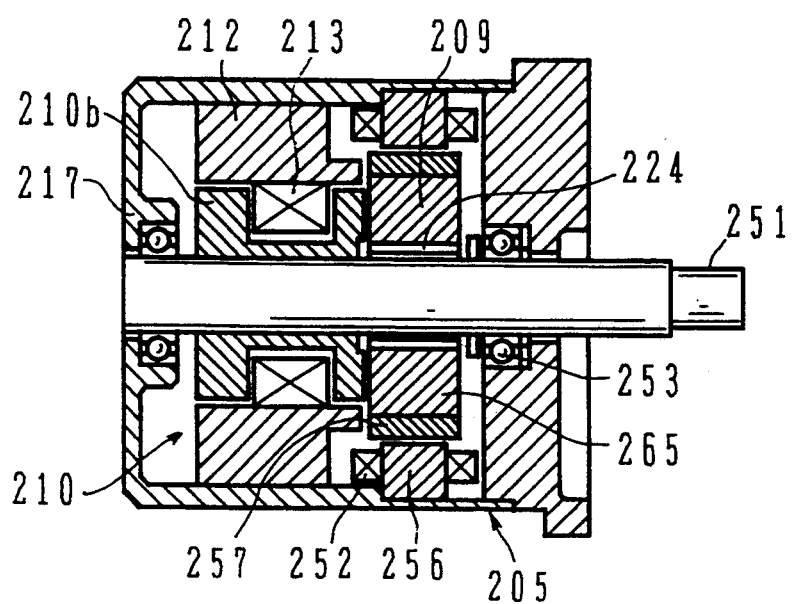
FIG. 4 is a sectional view of a solenoid clutch and a motor of an electronic throttle system according to a second embodiment of the present invention.

FIG. 4 shows, in section, a solenoid clutch 210 and a motor 205 provided in an electronically controlled throttle actuator of an electronic throttle system of this embodiment. In FIG. 4, the electronic throttle system of this embodiment is arranged such that the motor 205 as a brushless motor and the solenoid clutch 210 are incorporated inside a motor case 217 to partly share a magnetic circuit. The remaining arrangement is similar to that of the above first embodiment.

More specifically, a motor rotor 265 provided with a magnetic path yoke 209 and a permanent magnet 257 is axially supported on the motor side of a motor shaft 251 through a slide bearing 224, whereas a clutch rotor 210b of the solenoid clutch 210 is disposed on the clutch side of the motor shaft 251. On the motor side of the motor case 217 as a stationary part, there are provided a bearing 253 for supporting the motor shaft 251, a stator 256 of the motor 205, and a coil 252. On the clutch side of the motor case 217, there are provided a clutch yoke 212 and a clutch coil 213.

In the above construction, when electric power is supplied to the coil 252 on the stator 256 with the solenoid clutch 210 turned off, only the motor rotor 265 is rotated. When the solenoid clutch 210 is turned on with the motor 205 stopped, the motor rotor 264 slides in the axial direction (to the left in FIG. 4) while being supported at the magnetic path yoke 209 by the slide bearing 224, thus coming into close contact with the clutch rotor 210b under magnetic attraction. When electric power is supplied to the coil 252 on the stator 256 in that state, torque generated by the motor rotor 265 can be taken out to the exterior through the motor shaft 251 because the motor rotor 265 and the motor shaft 251 are now mechanically connected to each other via the clutch rotor 210b.

With this embodiment, since the motor 205 is of a brushless motor and a part of the magnetic circuit for the motor 205 is used as a part of the magnetic circuit for the solenoid clutch 210, the construction of the motor 205 and the solenoid clutch 210 is simplified and the number of components is reduced. Consequently, the electronic throttle system can be reduced in size and weight.

While the above first and second embodiments are arranged to control the opening of the throttle valve with rotation of the motor based on the signal from the accelerator sensor during normal operation, and mechanically adjust the opening of the throttle valve through the accelerator wire in the event of an abnormal condition, the electronic throttle system may be arranged in a different manner as follows.

More specifically, referring to FIG. 3, the solenoid clutch 110 is turned off during normal operation so that, upon the driver treading on the accelerator pedal 130, the throttle valve 102 is rotated in the valve opening direction via the accelerator wire 111, the accelerator drum 132 and the control lever 135, causing the opening of the throttle valve 102 to be adjusted only by mechanical operation applied from the driver. When the tire happens to slip, the solenoid clutch 110 is turned on and the throttle valve 102 is controlled with rotation of the motor 105 to rotate in the valve closing direction. At this time, similarly to the above case, the throttle valve 102 is forcibly rotated in the valve closing direction regardless of the position of the accelerator pedal 130 as far as such a rotation is allowed by the lost motion springs 107. In the event of an abnormal condition of the motor, the opening of the throttle valve 102 is mechanically adjusted by the accelerator pedal 130 as with the above case.

Thus, the first and second embodiments can be modified as explained above with the result of similar advantages.

A third embodiment of the present invention will be described with reference to FIGS. 5 to 7.

Figure 5:
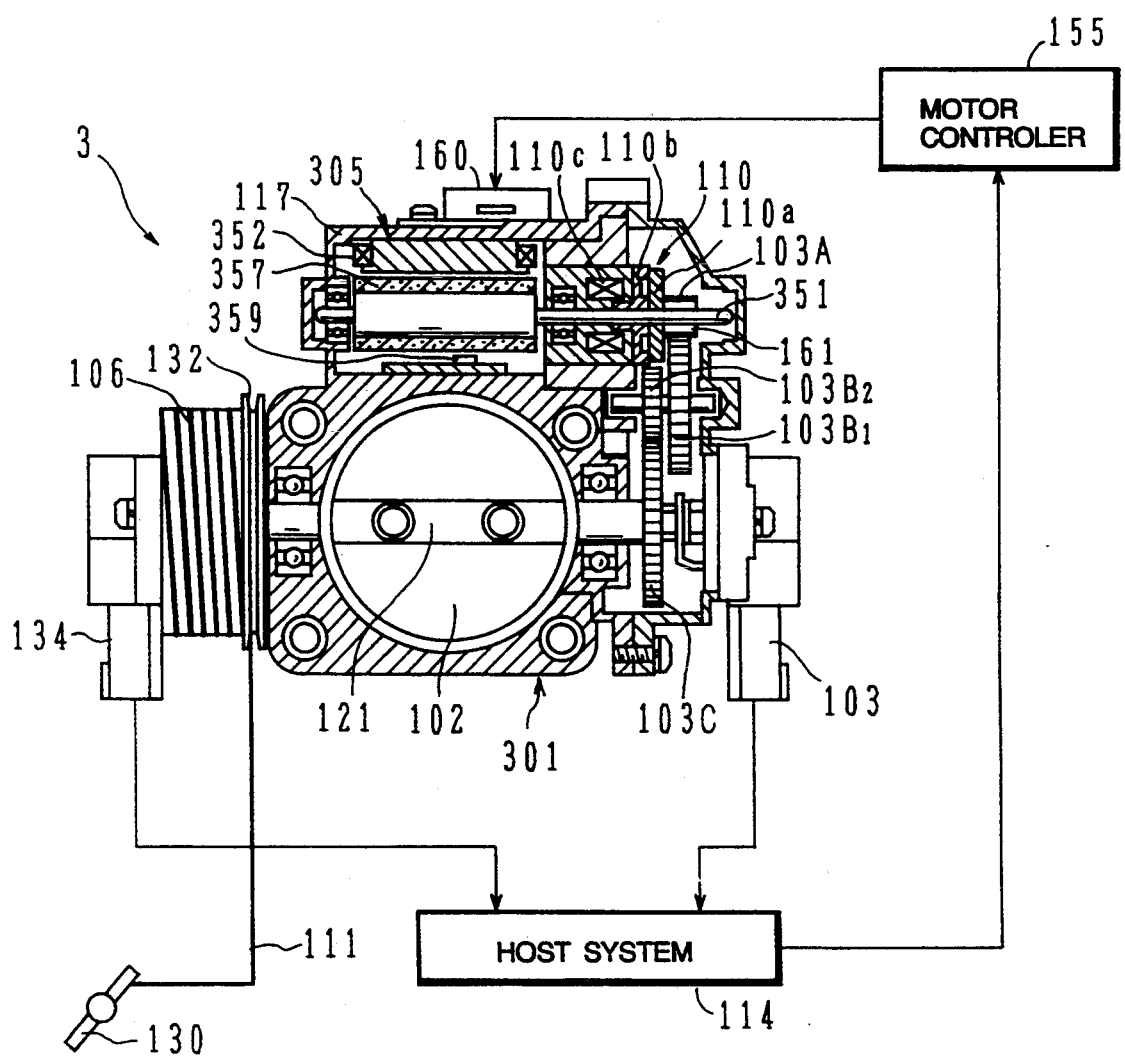
FIG. 5 is a view showing the entire construction of an electronic throttle system according to a third embodiment of the present invention.
Figure 6:
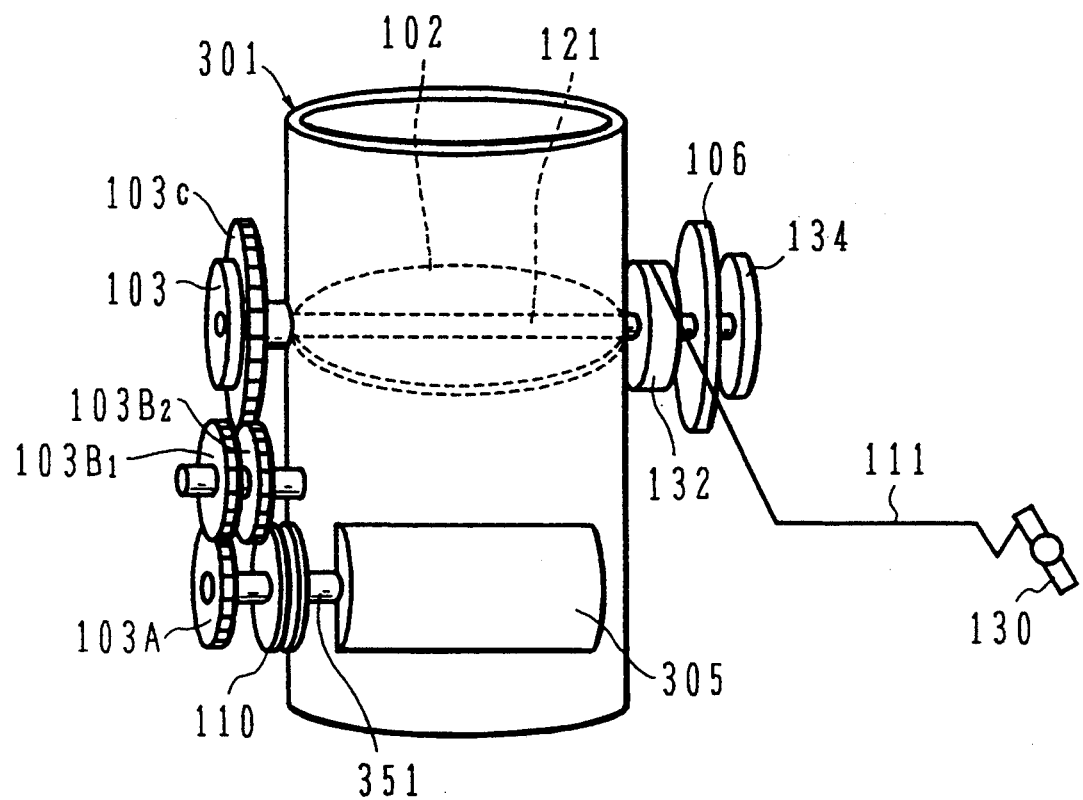
FIG. 6 is a view showing the entire construction of the electronic throttle system according to the third embodiment of the present invention.

FIGS. 5 and 6 show the entire construction of an electronic throttle system of this embodiment. Those parts common to those in the first embodiment are denoted by the common reference numerals.

In FIGS. 5 and 6, the electronic throttle system of this embodiment employs, as a motor for use with an electronically controlled throttle actuator 3, a brushless motor in the form of a half-round motor 305 having a substantially semicircular cross-section with its stator circumference partly flattened, for the purpose of further reducing a entire size of the electronic throttle system. The remaining arrangement is almost the same as the first embodiment.

FIG. 7 shows a cross-section of the half-round motor 305.

In FIG. 7, the half-round motor 305 comprises a motor shaft 351, a rotor 365 provided with a magnetic path yoke 309 and a permanent magnet 357, and a stator 356 having coils 352 wound over the same. The stator 356 is constituted by forming nine salient poles 354 spaced with an angular interval of 30 degrees and winding the coil 352 over each of the salient poles 354. The space provided with no salient poles corresponds to a cutout portion in the semicircular cross-section, and three magnetic pole sensors 359 for detecting magnetic pole positions are arranged side by side in the cutout portion. The coil 352 is wound over one salient pole 354 for each of three phases such that the three coils in three phases are positioned successively and the three coils in each phase are interconnected in series, thereby providing Y-connection as a whole. The half-round motor 305 thus constructed is disposed in a bore of a throttle valve 302 in adjacent relation to a bore wall.

With this embodiment, since a motor is of the half-round motor 305 with a substantially semicircular cross-section which has a round portion generating torque and a flat portion generating no torque, and the magnetic pole sensors 359 for detecting magnetic pole positions are disposed in the flat portion, the sectional area of the motor is made smaller and the system size in a direction perpendicular to the valve shaft 121 can be reduced. Also, there is no need of providing a separate space in which the magnetic pole sensors 359 are to be disposed. Further, since the flat portion including the magnetic pole sensors 359 is held in contact with the throttle body 301 which is always under cooling by the intake air, and its cooling is promoted by thermal conduction, the magnetic pole sensors 359 can operate in a stable manner and expensive heat-resistant magnetic pole sensors are no longer required, resulting in a reduced cost.

While the above third embodiment has been described as arranging the half-round motor 305 and the throttle valve 102 into the U-shaped form for interconnection through the gears 103A to 103C, the half-round motor 305 may be disposed on an axial extension of the valve shaft 121 of the throttle valve 102 via gears, similarly to the normal case, with the result of the similar advantages.

A fourth embodiment of the present invention will be described with reference to FIGS. 8 to 10.

Figure 8:
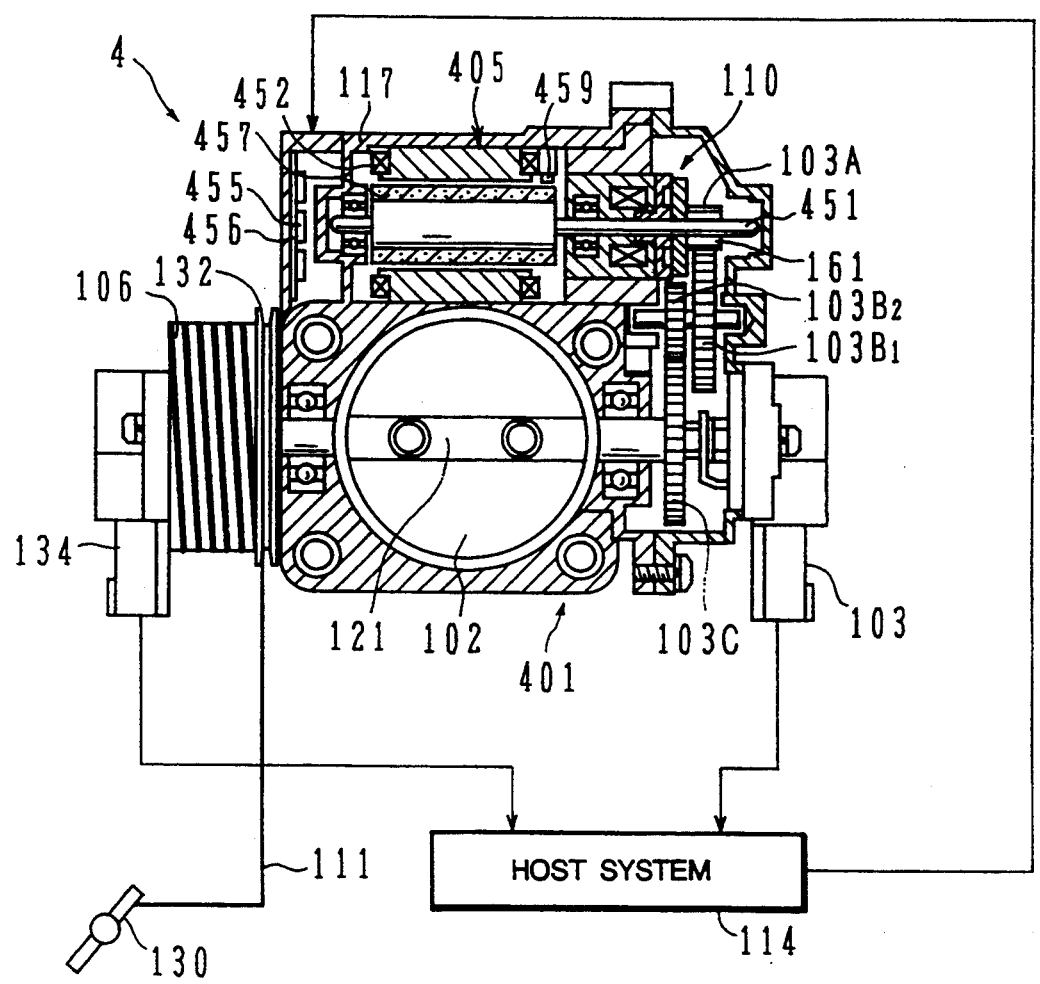
FIG. 8 is a view showing the entire construction of an electronic throttle system according to a fourth embodiment of the present invention.

FIG. 8 shows the entire construction of an electronic throttle system of this embodiment. Those parts common to those in the first to third embodiments are denoted by the common reference numerals.

In FIG. 8, the electronic throttle system of this embodiment is arranged such that a brushless motor is employed as a motor 405 for use with an electronically controlled throttle actuator 4, and a motor controller 455 as a control circuit for the motor 405 is disposed in a motor controller case 456 integrally molded with the motor case 117. The remaining arrangement is almost the same as the first to third embodiments.

Figure 9:
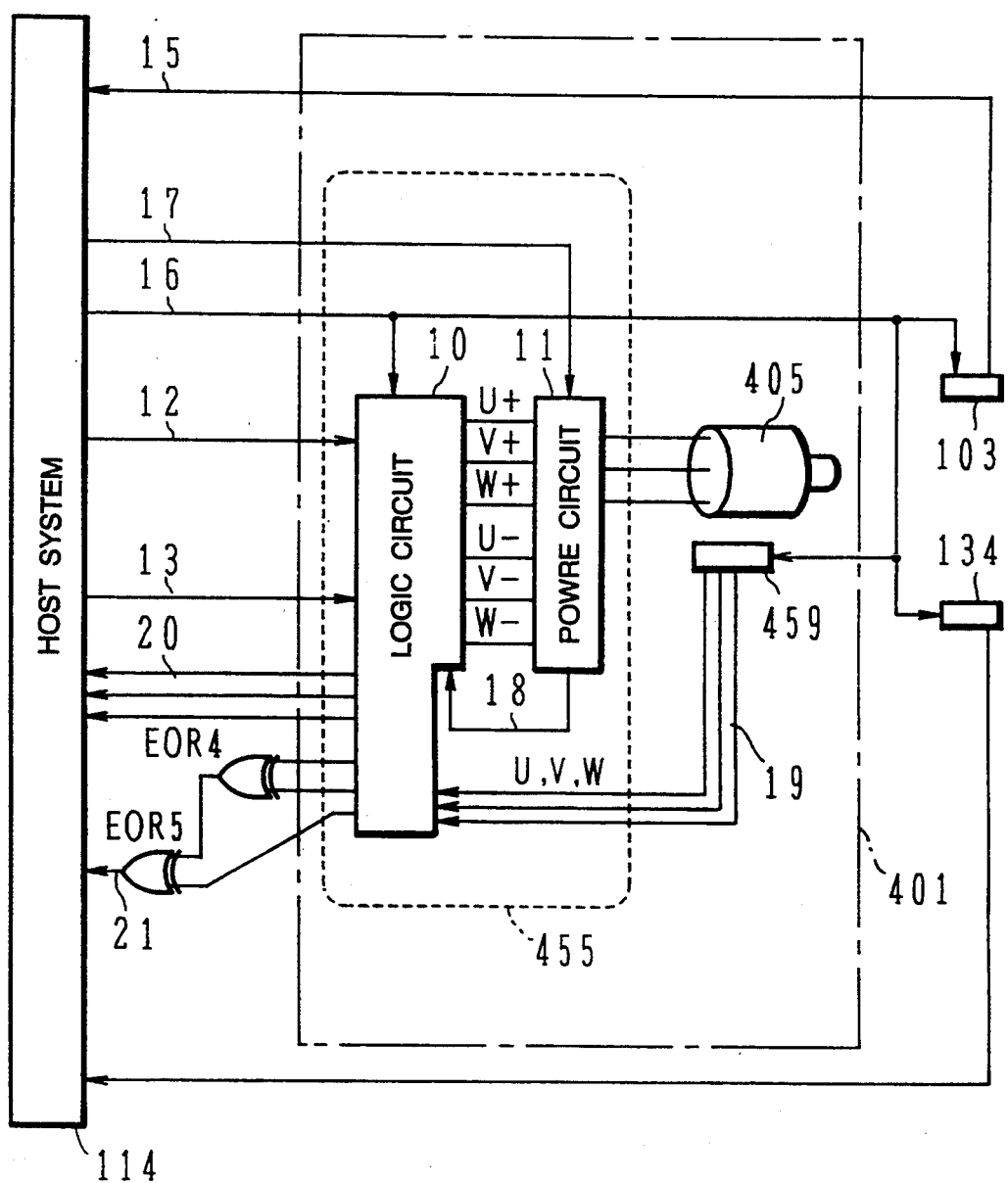
FIG. 9 is a diagram showing the circuit configuration of the electronic throttle system of FIG. 8.

FIG. 9 shows the circuit configuration of the electronic throttle system of this embodiment.

In FIG. 9, the motor controller 455 provided as one of control means for the electronic throttle system of this embodiment comprises a power circuit 11 such as an inverter for Supplying electric power to the motor 405, and a logic circuit 10 for carrying out phase switching for the power circuit 11.

Applied to the power circuit 11 is motor supply power 17 for driving the motor from the host system 114 as one of control means for the electronic throttle system of this embodiment. Also, applied to the logic circuit 10 are circuit supply power 16, a direction-of-rotation command 13 for controlling forward/backward rotation of the motor, and a speed command 12 as a duty command for controlling a voltage applied to the motor, from the host system 114, as well as a current detected signal ("L" level if larger than reference value) 18 for detecting a current flowing through the motor, from the power circuit 11, and magnetic pole sensor signals 19 from magnetic pole sensors 459 in three phases (i.e., U-phase, V-phase and W-phase). These magnetic pole sensor signals 19 are used to carry out phase switching for the power circuit 11.

A part of the magnetic pole sensor signals 19 is further branched into rotation detected signals 20 and magnetic pole signals 21 (see FIG. 10 described later) in the logic circuit 10 before entering the host system 114. The rotation detected signals 20 are used to detect the direction of rotation of the motor 405 and abnormality of the magnetic pole sensor signals 19 in the host system 114. The magnetic pole signals 21 are subjected to the exclusive logical summation through an EOR 4 and an EOR 5 for conversion into a signal corresponding to 60 degrees of electrical angle, before being used to detect the position of rotation of the motor 405 in the host system 114.

Figure 10:
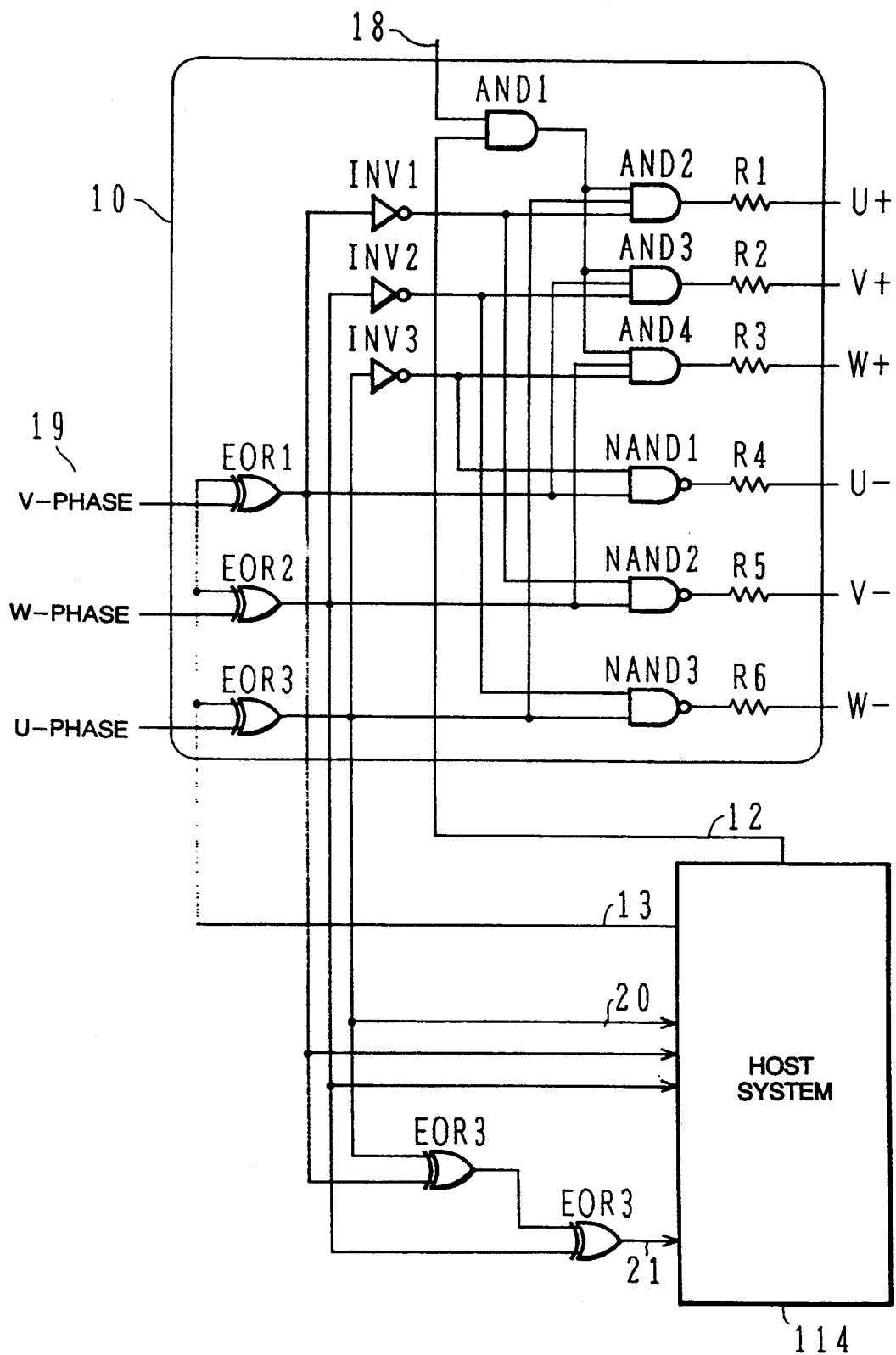
FIG. 10 is a diagram showing the detailed configuration of a logic circuit.

FIG. 10 shows the detailed configuration of the logic circuit. 10.

In FIG. 10, the logic circuit 10 comprises exclusive logical sum (OR) circuits EOR1 to EOR 3, negation (NOT) circuits INV1 to INV 3, logical product (AND) circuits AND1 to AND4, and NOT-AND circuits NAND1 to NAND3, these circuits themselves being generally well known.

Control executed by the above-mentioned circuit will now be described.

In FIGS. 9 and 10, the magnetic pole sensors 459 detect the magnetic pole positions of the rotor of the motor 405 and transmit them as the magnetic pole sensor signals 19 to the logic circuit 10. Based on the magnetic pole sensor signals 19 from the magnetic pole sensors 459 and the direction-of-rotation command 13 from the host system 114, the logic circuit 10 selects one power supply phase for the power circuit 11 from the U-, V- and W-phases in succession, thereby driving the motor 405.

On the other hand, the opening sensor 103 detects the position of the throttle valve 121 and transmits it as an actual opening signal 15 to the host system 114. Based on the result detected by the opening sensor 103, the host system 114 transmits, to the logic circuit 10, the speed command 12 for controlling a voltage applied to the motor 405 so that the throttle valve 121 is rotated to a target position. The logic circuit 10 controls an average voltage applied from the power circuit 11 to the motor 405 based on the speed command 12, thereby rotating the throttle valve 121 to the target position.

With this embodiment, since the motor controller 455 provided as one of control means of the electronic throttle system for controlling the motor 405 is disposed in the motor controller case 456 integrally molded with the motor case 117, the number of wirings such as power supply lines and signal lines is reduced to cut down the number of wire harnesses connecting an engine room and a passenger room and hence simplify wiring operation, enabling the electronic throttle system to be reduced in size and weight. This is also effective in reducing an influence of noise upon the signal lines. Additionally, the motor controller 455 is held in contact with the throttle body 401 which is always under cooling by the intake air and, therefore, its cooling is promoted by thermal conduction.

While the above fourth embodiment has been described as arranging the motor 405 and the throttle valve 102 into the U-shaped form for interconnection through the gears 103A to 103C, the motor 405 may be disposed on an axial extension of the valve shaft 121 of the throttle valve 102 via gears, similarly to the normal case, with the result of the similar advantages.

A fifth embodiment of the present invention will be described with reference to FIGS. 11 and 12.

Figure 11:
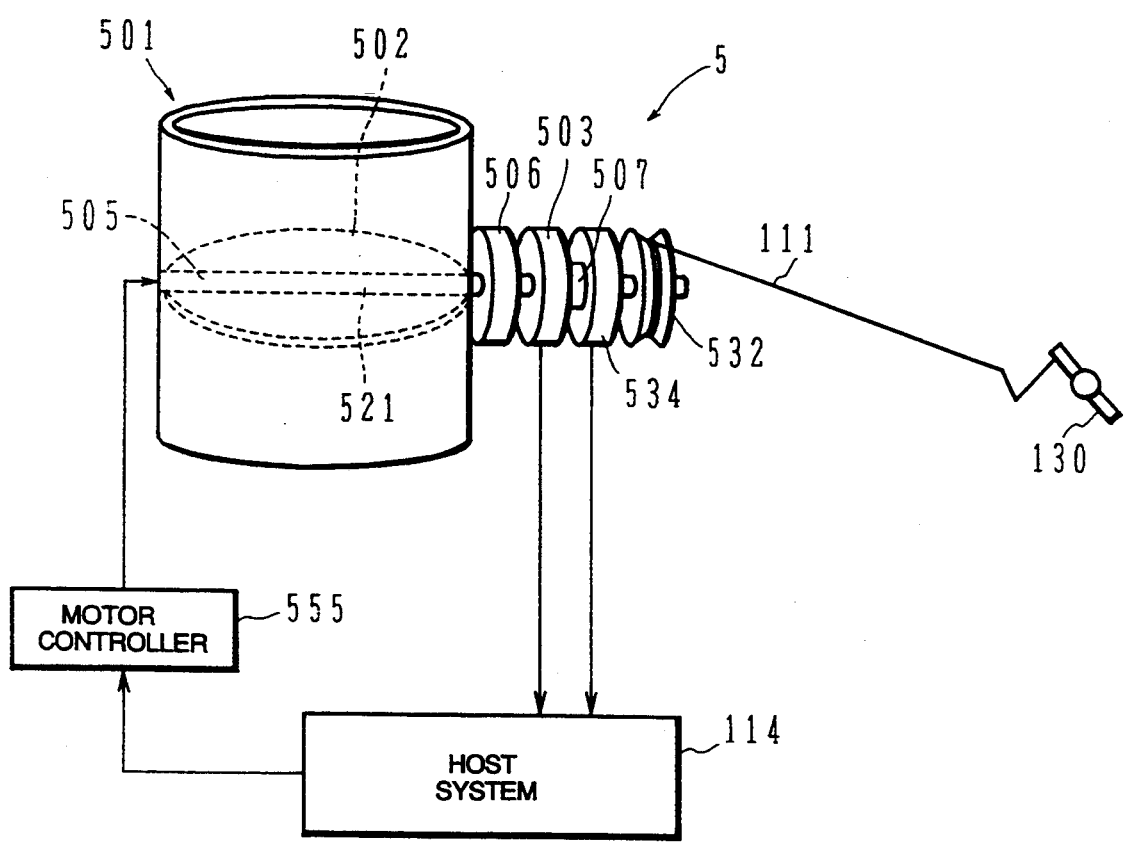
FIG. 11 is a view showing the entire construction of an electronic throttle system according to a fifth embodiment of the present invention.
Figure 12:
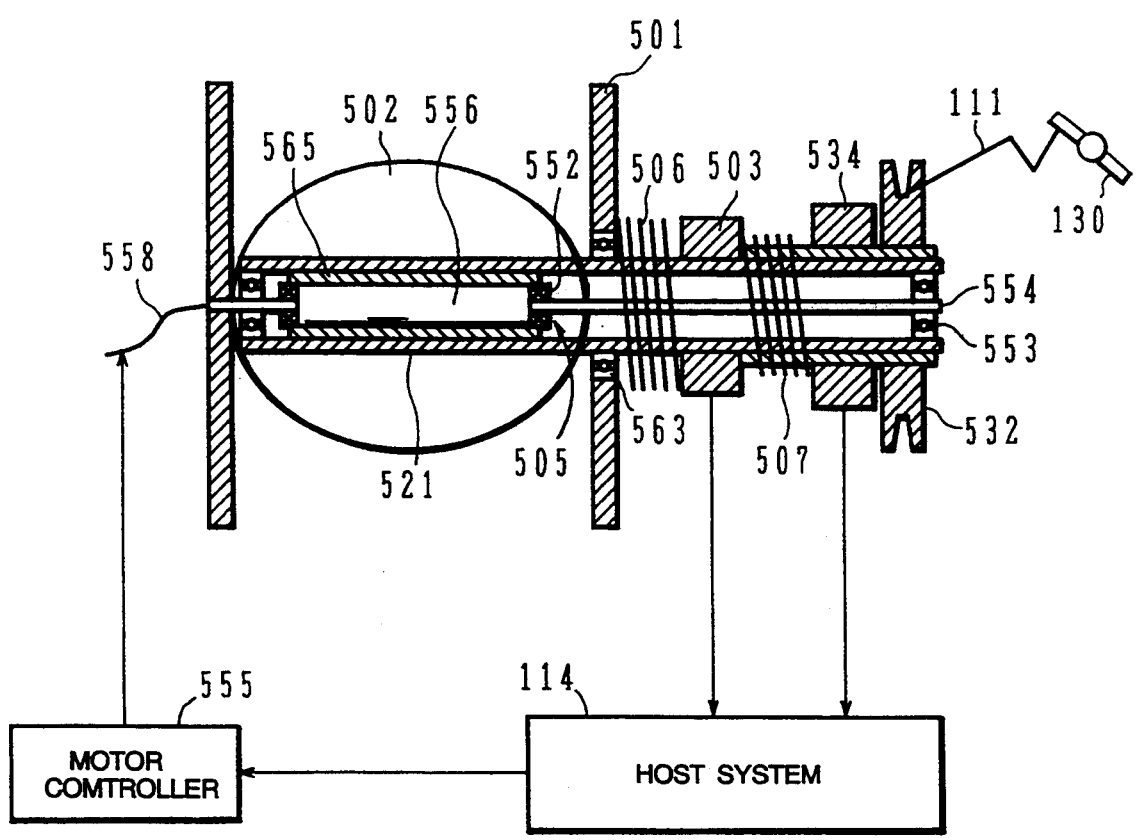
FIG. 12 is a view showing the entire construction of the electronic throttle system according to the fifth embodiment of the present invention.

FIG. 11 shows the entire construction of an electronic throttle system of this embodiment, and FIG. 12 shows the detailed structure of a motor 505 for use with an electronically controlled throttle actuator 5 of the electronic throttle system. This embodiment employs a shaft motor as the motor 505 which is incorporated in a valve shaft 521. Those parts common to those in the first to fourth embodiments are denoted by the common reference numerals.

In FIGS. 11 and 12, the electronic throttle system includes the electronically controlled throttle actuator 5 having a throttle body 501. The electronic throttle system also includes, as control means, a motor controller 555 for controlling rotation of the motor 505 and a host system 114 for carrying out, in concentrated fashion, not only general control of the electronic throttle system but also control of other parts of an automobile such as an air conditioner.

The throttle body 501 comprises a throttle valve 502 for controlling a flow rate of intake air, and a valve shaft 521 disposed at the center of the throttle valve 502.

On one side of the valve shaft 521, there are provided an accelerator drum 532 coupled to an accelerator pedal 130 via an accelerator wire 111, an accelerator sensor 534 for detecting rotation of the accelerator drum 532 and transmitting a detected signal to the host system 114, a lost motion spring 507, an opening sensor 503 for detecting rotation of the valve shaft 521, and a return spring 506 for urging the accelerator drum 532 in the closing direction of the throttle valve 502.

The valve shaft 521 is fixed to the throttle body 501 through a bearing 563. The motor 505 being of a brushless motor or a stepping motor is disposed in the valve shaft 521, and a stator shaft 554 serving as a shaft of the motor 505 is supported to the valve shaft 521 through a bearing 553. Further, a rotor 565 constituted by a permanent magnet is fixedly disposed inside the valve shaft 521.

A stator 556 having a coil 552 wound over the same is fixed to the stator shaft 554. The stator shaft 554 is of a hollow shaft so that electric wires for the motor 505 can be led out as a lead wire 558 to the exterior without interfering with operation of the throttle valve 502.

With this embodiment, since the motor 505 is incorporated in the valve shaft 521 it is possible to achieve a reduction in size and weight of not only the motor 505 but also the electronic throttle system. Furthermore, with the motor 505 disposed in a passage through which the intake air is always sucked to flow, cooling of the motor 505 is promoted.

While the above fifth embodiment has been explained in connection with the case of the motor 505 being of a brushless motor, a normal DC motor may be used instead of the brushless motor with the result of a similar advantage.

A sixth embodiment of the present invention will be described with reference to FIGS. 13 and 14.

Figure 13:
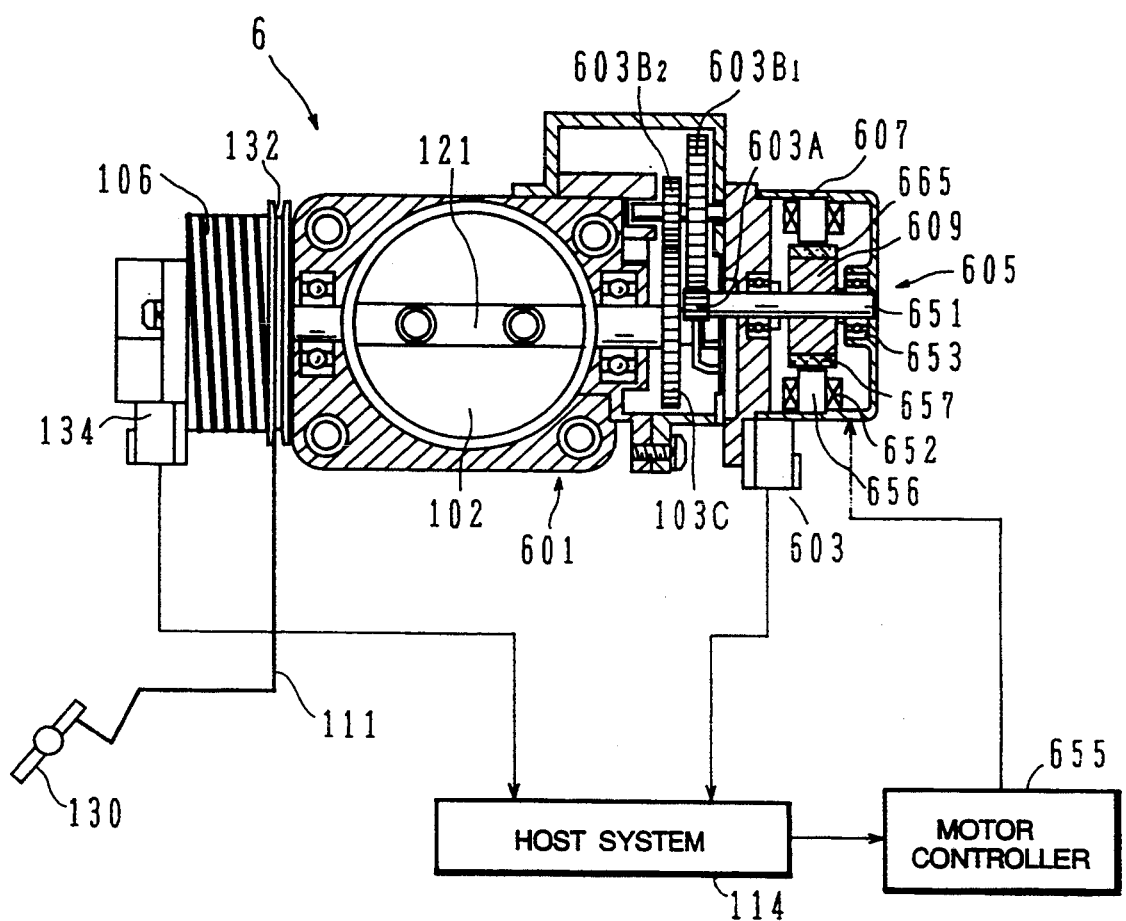
FIG. 13 is a view showing the entire construction of an electronic throttle system according to a sixth embodiment of the present invention.

FIG. 13 shows the entire construction of an electronic throttle system of this embodiment. Those parts common to those in the first to fifth embodiments are denoted by the common reference numerals.

In FIG. 13, the electronic throttle system of this embodiment employs, as a motor for use with an electronically controlled throttle actuator 6, a brushless motor with magnetic pole sensors disposed on salient poles of a stator, the motor being arranged axially of a throttle body.

The electronic throttle system includes the electronically controlled throttle actuator 6 having a throttle body 601. The electronic throttle system also includes, as control means, a motor controller 655 for controlling rotation of the motor and a host system 114 for carrying out, in concentrated fashion, not only general control of the electronic throttle system but also control of other parts of an automobile such as an air conditioner.

On the side of a valve shaft 121 opposite to an accelerator drum 132, there are provided a large-diameter gear 103C and an opening sensor 603. The gear 103C is in mesh with a gear 603B2 on an intermediate shaft, and another gear 603B1 coaxially with the gear 103B2 on the intermediate shaft is in mesh with a gear 603A on a motor shaft 651 of a motor 605.

The motor 605 is of a brushless motor comprising a motor shaft 651, a rotor 665 provided with a magnetic path yoke 609 and a permanent magnet 657, a stator 656 having a coil 652 wound over the same, and a bearing 653, the motor being housed in a motor case 607.

Figure 14:
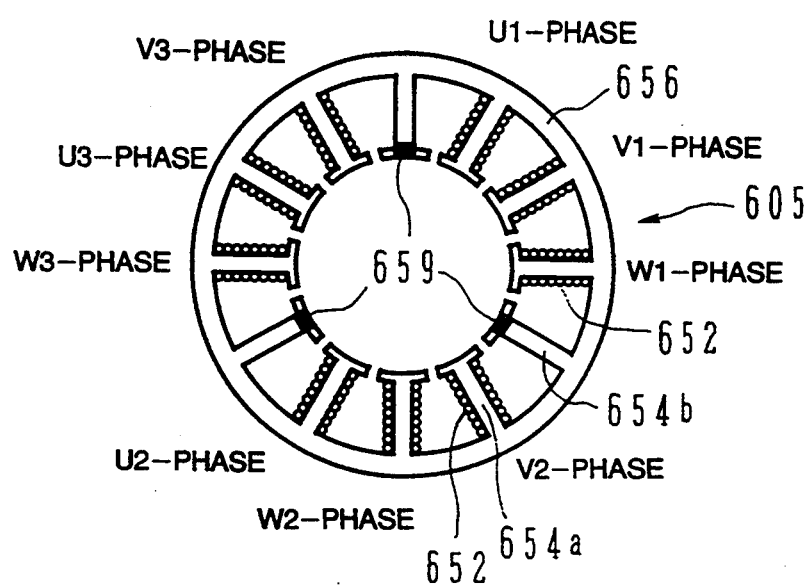
FIG. 14 is a cross-sectional view of a motor.

FIG. 14 shows a cross-section of the motor 605 for use with the electronically controlled throttle actuator 6.

In FIG. 14, the stator 656 of the motor 605 is provided with salient poles 654a, 654b in number of the multiple of three (e.g., 12), and the coils 652 are wound over the salient poles except those three ones described below. Specifically, no coils are wound over one set of three salient poles 654b, and magnetic pole sensors 659 such as Hall devices for detecting magnetic pole positions are arranged with a phase angle of 120 degrees. The reason why the salient poles are arranged with a phase angle of 120 degrees herein is in reducing a degree of cogging torque generated at the magnetic poles. Further, the coil 652 is wound over one salient pole 654a for each of three phases such that the three coils in three phases are positioned successively and the three coils in each phase are interconnected in series, thereby providing Y-connection as a whole.

With this embodiment thus arranged, the motor 605 has the nine salient poles 654a having the coils wound over the same and the three salient poles 654b provided with no coils wound over the same but the magnetic pole sensors 659 attached thereto, whereby the torque is reduced to $\frac{3}{4}$ of that in the prior art (having coils wound over twelve salient poles) and a stack thickness of the motor 605 itself must be increased to 4/3 times the conventional thickness in order to obtain the same torque. On the other hand, a magnetic force generator (for example, a rotor for magnetic pole sensors) which has been required to mount the magnetic pole sensors in the past can be eliminated. Therefore, the axial length can be shortened correspondingly to enable a reduction in size and weight of the motor 605 and hence a reduced size of the electronic throttle system in the axial direction of the valve shaft 121. Also, the number of parts is reduced and the production cost is cut down. Further, since the permanent magnet of the motor 605 can be utilized as a magnetic force generator for magnetic pole sensors, there is no need of separately providing such a magnetic force generator for the magnetic pole sensors 659, with the result of a reduction in the number of parts and the cost. Additionally, cooling of the magnetic pole sensors 659 is promoted by thermal conduction to the stator 656 and expensive heat-resistant magnetic pole sensors are no longer required, resulting in a reduced cost.

An electronic throttle system according to a seventh embodiment of the present invention will be described with reference to FIGS. 15 to 17. Those parts common to those in the first to sixth embodiments are denoted by the common reference numerals.

Generally, as a rotational speed of a motor increases, a basic frequency of the motor is raised and a time of one period is shortened. However, because rising of a current is determined by a resistance value and inductance value of the motor, high-speed rotation of the motor gives rise to the problem of a time delay in current that is not encountered under a state of low-speed rotation. The relationship between an induced voltage and a time delay in current will be explained below in detail.

Figure 15:
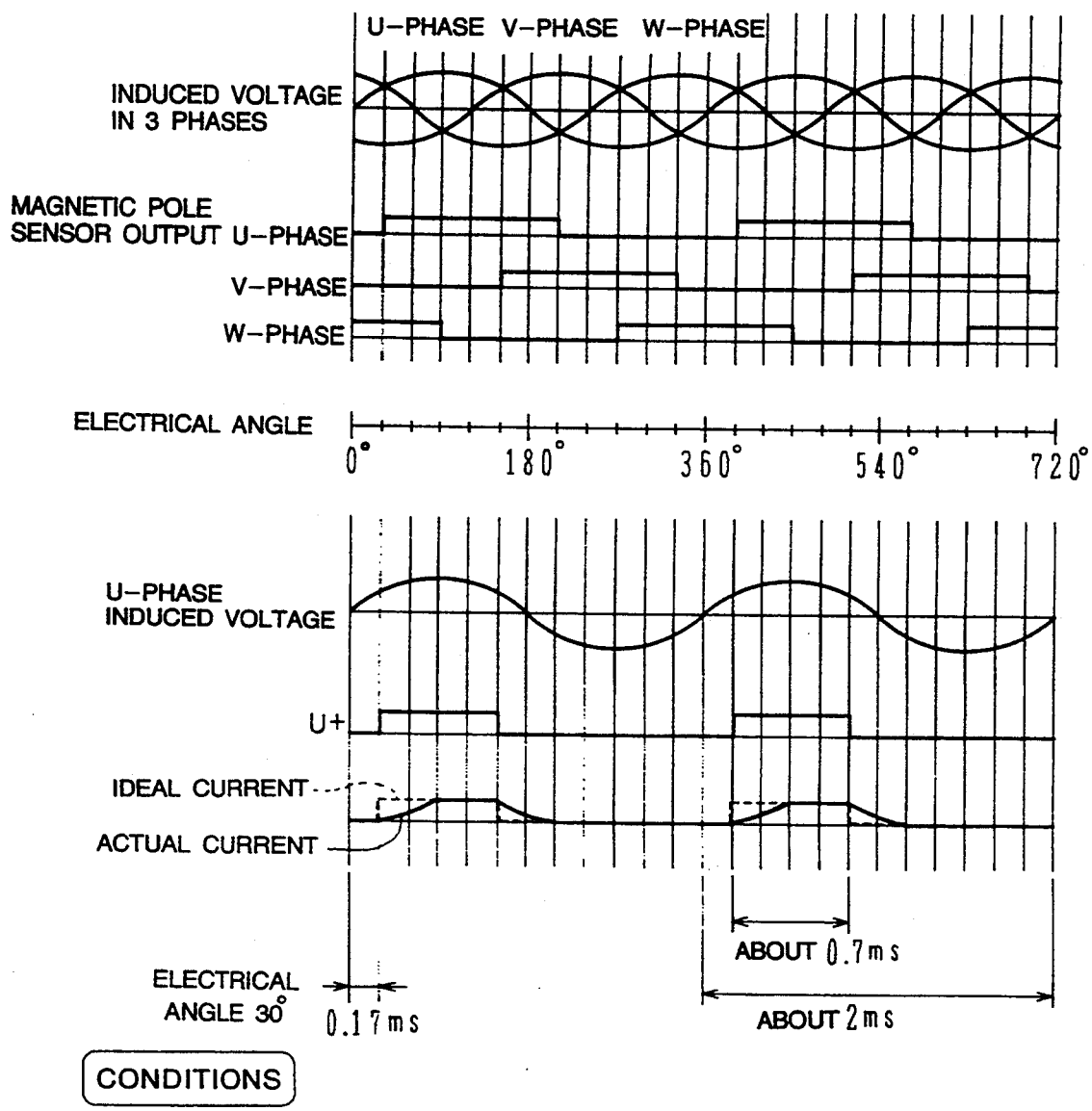
FIG. 15 is a timing chart showing the relationship between an induced voltage and a supply current.

FIG. 15 shows, by way example, the relationship between an induced voltage and a supply current in a brushless motor. Operating conditions of the motor are as follows: the number of motor poles is eight, the rotational speed is 7200 rpm, the resistance is 1 Ω and the inductance is 0.3 mH. Under these conditions, the frequency is 480 Hz, the period is 2 ms, and the electrical time constant is 0.3 ms.

In FIG. 15, induced voltages in U-, V- and W-phases and magnetic sensor outputs in U-, V- and W-phases are related to each other, respectively, as shown in FIG. 15. Thus, the magnetic sensor output is delayed from the voltage in phase by about 30 degrees of electrical angle.

Meanwhile, torque generated from a motor is determined by the product of an induced voltage and an actual current. For effectively taking out motor torque, therefore, it is required for a current to flow so that the product of an induced voltage and an actual current is maximized for each phase.

As a method of satisfying such a requirement, taking now the U-phase as an example, it is conceivable to flow a current for a period of time from the rising edge to the falling edge of a U+signal (see FIG. 15) which is prepared from the U-phase output and the V-phase output among the magnetic pole sensor outputs in the logic circuit 10 (see FIG. 10) for the above fourth embodiment. Stated otherwise, this method is intended to obtain large torque by ignoring those portions of a positive area defined by a sine curve of the U-phase induced voltage (from 0 to 180 degrees of electrical angle) which range from 0 to 30 degrees and 150 to 180 degrees at both ends, because those portions have a small voltage value, and by flowing a current during the time from 30 to 150 degrees. An ideal current in this case has a waveform indicated by broken lines.

In an attempt at so flowing the current, however, there occurs a time delay in current for a motor rotating at high speeds, as explained above, due to such a characteristic that rising of a current is determined by a resistance value and inductance value of the motor. In practice, rising of the actual current is delayed as indicated by solid lines and the generated torque is lowered correspondingly to a delay in the rising. In an ordinary electronic throttle system, therefore, the timing of flowing a current to a motor is changed over using signals from magnetic pole sensors such as Hall devices or Hall sensors. This embodiment is intended to, without such timing control, make control so as to flow a current as large as possible for a period of time from the rising edge to the falling edge of the U+ signal, thereby providing maximum torque. The arrangement of this embodiment will be described below.

Figure 16:
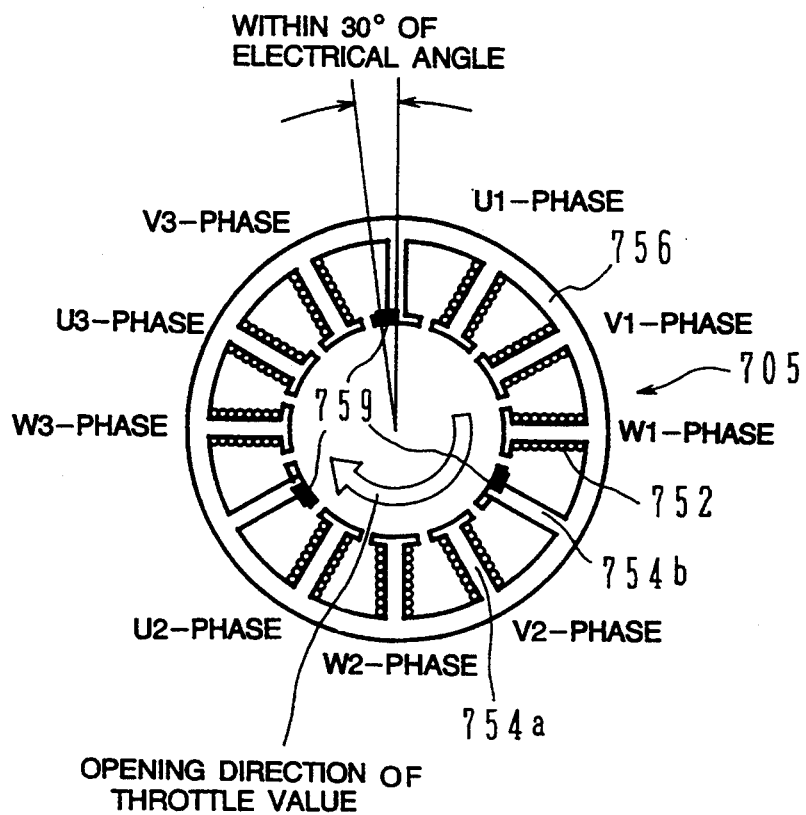
FIG. 16 is a cross-sectional view of a motor.

FIG. 16 shows a cross-section of a motor 705 for use with an electronically controlled throttle actuator of the electronic throttle system of this embodiment.

In FIG. 16, the motor 705 is different from the motor 605 shown in FIG. 14 in that magnetic pole sensors 759 are disposed at not the centers of respective salient poles 754b, but positions shifted in a direction opposite to the direction of rotation of a rotor 765 (i.e., the direction indicated by an arrow in FIG. 16 = the clockwise direction) with which the throttle valve 102 is rotated in the opening direction. The other construction is similar to the motor 605 shown in FIG. 14.

If the shift angle is too large, this would give rise to an unfavorable result of producing torque in the direction of reversed rotation when the motor is not rotating at high speeds, contrary to the intention. Accordingly, it is appropriate that the shift angle from the center of the salient pole 754b is within the range of 30 degrees of electrical angle, as shown, on an assumption of defining the basic frequency of the motor as 360 degrees of electrical angle. Arranging each magnetic pole sensor within such an angular range makes it possible to not only compensate for a time delay during high-speed rotation, but also produce torque in the positive or forward direction during the time other than high-speed rotation.

Figure 17:
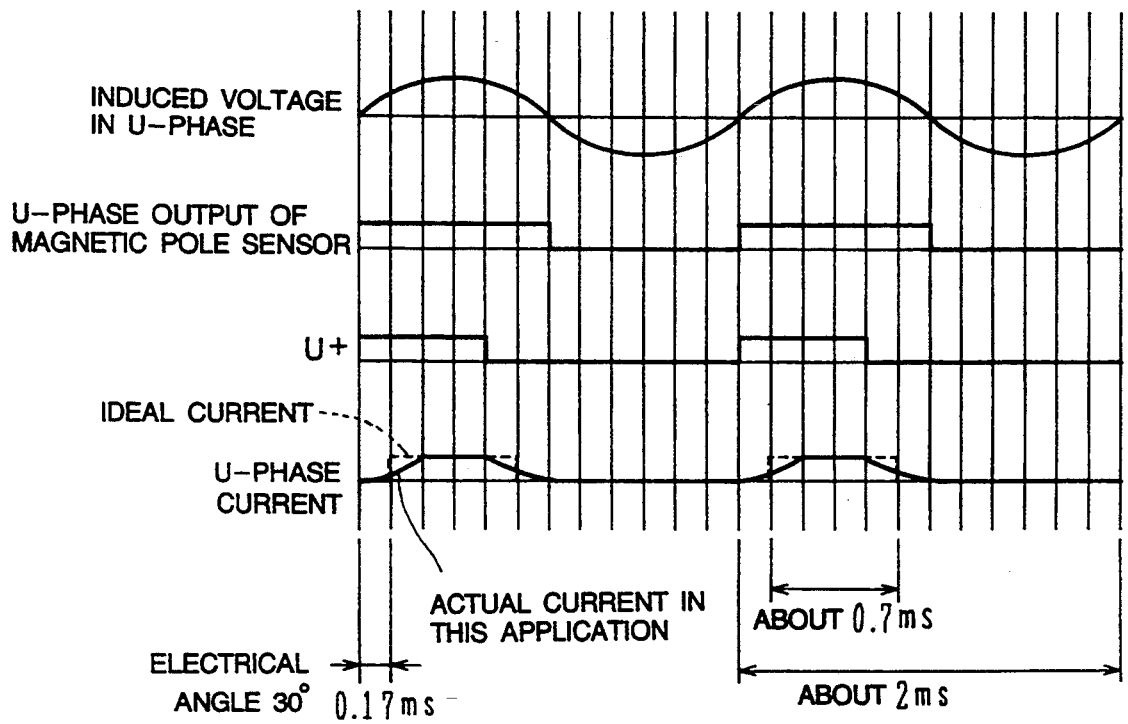
FIG. 17 is a timing chart showing the relationship between an induced voltage and a supply current in a seventh embodiment of the present invention.

FIG. 17 shows the relationship between an induced voltage and a supply current in the motor 705 for use with the electronic throttle system of this embodiment constructed as explained above. Operating conditions of the motor 705 are the same as those in FIG. 15, which also similarly results in that the frequency is 480 Hz, the period is 2 ms, and the electrical time constant is 0.3 ms.

In FIG. 17, with each magnetic pole sensor 759 shifted within the range of 30 degrees of electrical angle, the U-phase output of the magnetic pole sensor and the curve of the actual current are related with each other, as shown, such that they are shifted to the left by 30 degrees of electrical angle in comparison with the relationship shown in FIG. 15. Stated otherwise, actual current can approach the phase of the ideal current for increasing the torque.

With this embodiment arranged as explained above, since the magnetic pole sensors 759 for the motor 705 are disposed at positions shifted from the centers of respective salient poles 754b within the range of 30 degrees of electrical angle in a direction opposite to the direction of rotation of the motor with which the throttle valve 102 is opened, a response during high-speed rotation is improved without producing torque in the reversed direction during low-speed rotation. Accordingly, a smaller motor than conventional can be used to achieve the same response ability upon request, with the result of a reduction in size and weight of the electronic throttle system.

While the above sixth and seventh embodiments have been explained in connection with the case of the motor being of a brushless motor, the similar advantage can also be obtained in a DC motor which has mechanical commutators, by shifting brush positions in a like manner.

An eighth embodiment of the present invention will be described with reference to FIGS. 18 to 20.

The entire construction of an electronic throttle system of this embodiment will be explained by referring to FIGS. 18 to 20. Those parts common to those in the first to seventh embodiments are denoted by the common reference numerals.

Figure 18:
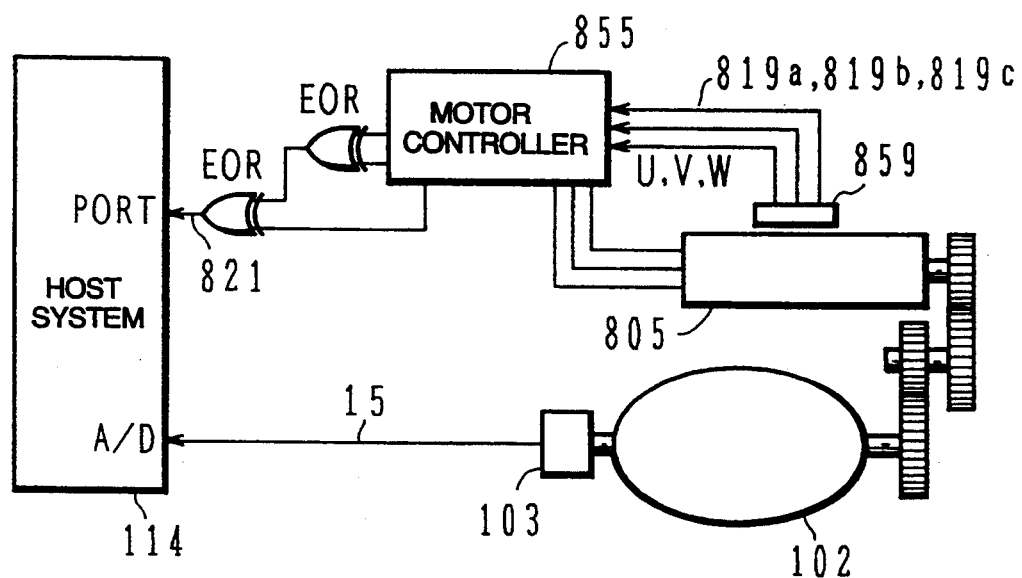
FIG. 18 is a view showing the entire construction of an electronic throttle system according to an eighth embodiment of the present invention.

In FIG. 18, the electronic throttle system of this embodiment is arranged such that the position of a throttle valve 102 is detected by an opening sensor 103 and the detected position is applied as an actual opening signal 15 in the form of an analog signal to an A/D conversion terminal of a host system 114 provided as one of control means. A motor 805 for use with an electronically controlled throttle actuator 8 is provided with magnetic pole sensors 859 for detecting magnetic pole positions of a rotor, and magnetic pole sensor signals 819a, 819b, 819c in three U-, V- and W-phases from the magnetic pole sensors 859 are converted into a magnetic pole signal 821 through a logic circuit (not shown) in a motor controller 855, provided as one of control means, and two EORs before entering a port terminal of the host system 114.

In the above arrangement, the opening sensor 103 is provided with an original intention of detecting small opening values of the throttle valve 102 with a high degree of resolution. This is attributable to the following two requirements i.e., resolution less than 0.1 degree is required to eliminate a fear that if resolution of the opening sensor is too low in a mode of ISC (Idle Speed Control), idling might be so unstable as to cause stalling of an engine and incomplete combustion of exhaust gas, and the engine rotational speed is required to be smoothly changed to reduce the idling rotational speed for the purpose of saving fuel consumption, which in turn requires high resolution at a low opening value (nearly 2 degrees in terms of angle). In a mode of normal control other than ISC, resolution is required to be on the order of 0.5 to 1.0 degree.

In the past, while such a capability has been required for the opening sensor 103, it has been conventional to employ the opening sensor 103 for detecting the overall opening range of the throttle valve 102. Attempting to cover the overall range from a low opening value to a high opening value necessarily results in reduced resolution and imposes a difficulty in providing high resolution (less than 0.1 degree) at low opening values as demanded. For that reason, a sub-valve for ISC is provided in parallel and in addition to a main throttle valve in many prior arts. Also, there has been another prior art of the type separately providing an opening sensor for a range of extremely low opening values.

In the electronic throttle system of this embodiment, only a range of low opening values is detected by the opening sensor 103, whereas other opening values higher than that range are detected by using the magnetic pole signal 821 based on magnetic pole sensor signals 819a to 819c from the motor 805. In other words, high resolution in the low opening range is obtained by the host system 114 which has a function as valve position control means and carries out position control of the throttle valve 102 based on a signal from the opening sensor 103 and signals from the magnetic pole sensors.

Detection of the opening by using the magnetic pole signal 821 will now be described in detail.

Figure 19:
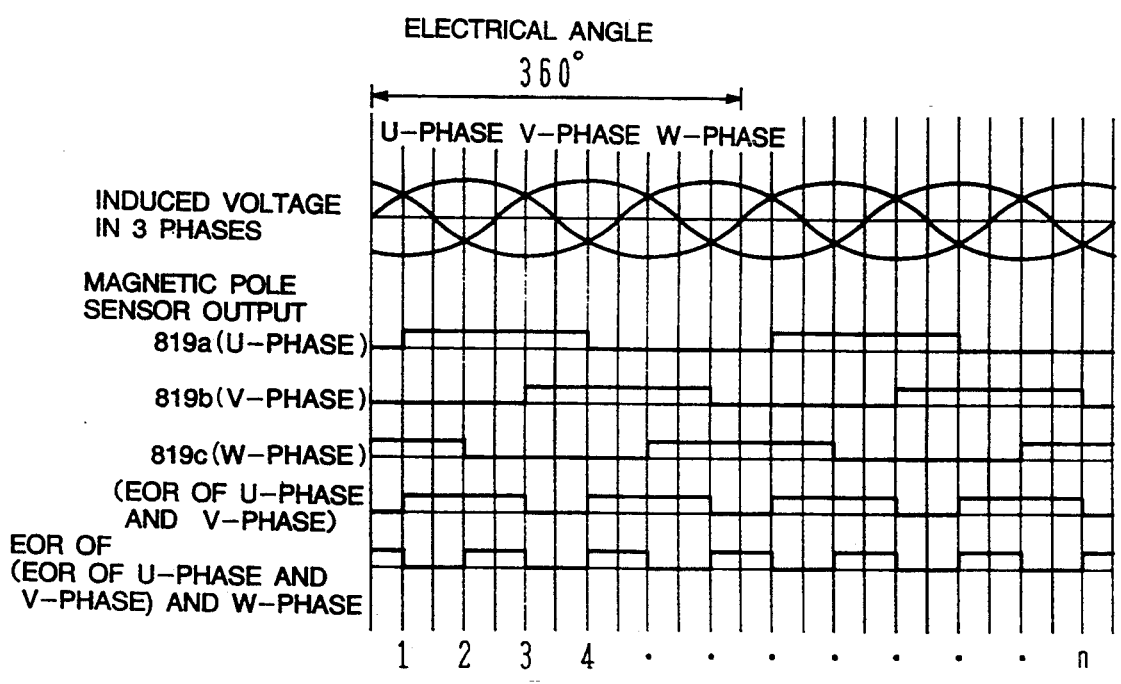
FIG. 19 is a timing chart for explaining operation to create pulses of a magnetic pole signal from magnetic pole sensor signals.

FIG. 19 shows operation for creating pulses of the magnetic pole signal 821 from the magnetic pole sensor signals 819a to 819c.

In FIG. 19, the relationship between an induced voltage of the motor 805 and phases of the magnetic pole sensor signals, as shown, similarly to FIG. 15. More specifically, the magnetic pole sensor signals 819a, 819b, 819c in three U-, V- and W-phases are pulses with a phase difference of 120 degrees therebetween. A signal having 60 degrees of electrical angle is created from these 3-phase signals. The U- and V-phase signals are first exclusively ORed to provide the exclusive logical sum which is then exclusively ORed with the W-phase signal to provide the exclusive logical sum. As a result, a signal having 60 degrees of electrical angle can be obtained. By detecting rising and falling of the resulting signal, the pulses of the magnetic pole signal 821 can be counted from 1 to n, as shown.

Here, since the number of pulses generated per rotation of a motor is given by (number of phases)×(number of poles) and the motor rotates in number resulted from multiplying the product by a gear ratio per rotation of the throttle valve, the number of pulses generated per-rotation of the throttle valve is given by (number of phases)×(number of poles)×(gear ratio). In the case of detecting rotation of the throttle valve, therefore, resolution per pulse can be expressed by the following general formula:

$$\text{resolution per pulse} = 360/(\text{number of phases}) \times (\text{number of poles}) \times (\text{gear ratio})$$
$$(\text{degree/pulse})$$

Assuming for the motor 805 that the gear ratio is 24:1, the number of phases is three, and the number of poles is eight, the number of pulses generated per rotation of the throttle valve is given by $3 \times 8 \times 24 = 576$ pulses. Accordingly, the resolution per pulse is given by $360/576 = 0.62$ degree which meets the range of demanded resolution value from 0.5 to 1.0 degree under normal control.

In the electronic throttle system of this embodiment, based on the above-mentioned principles, the host system 114 as valve position control means operates to perform control for the low opening range by using the actual opening signal 15 from the opening sensor 103 under ISC, and perform control for the opening range greater than a certain set opening (hereinafter referred to as a boundary opening) by using the magnetic pole sensor signals 819 from the magnetic pole sensors 859. In other words, the opening of the throttle valve is controlled by the host system 114 as valve position control means by switching over the actual opening signal 15 and the magnetic pole sensor signals 819 at the boundary opening to be selectively used.

Setting of the boundary opening will now be described.

As explained above, it is often practiced in ordinary engine control that an ISC sub-valve dedicated to ISC operation is provided separately from and in parallel to a throttle valve used for normal traveling, and the opening control is made only by such a sub-valve during the ISC operation, primarily for the purpose of ensuring high resolution.

Meanwhile, in the electronic throttle system of this embodiment, the opening control is made only by the throttle valve without providing any sub-valve and, therefore, the opening to be controlled during the ISC operation is less than about 2 degrees in terms of the opening of the throttle valve (hereinafter referred to as an ISC control region). Then, the opening of the throttle valve greater than about 2 degrees corresponds to a normal control region.

For control in the valve opening direction in which the engine rotational speed increases, the valve opening is increased starting from 0 degree in the ISC control region and enters the normal control region upon exceeding about 2 degrees.

On the other hand, for control in the valve closing direction in which the engine rotational speed decreases conversely, the throttle valve is gradually closed in the normal control region. During this process, there is a range where the control is to be made to moderately lower the engine rotational speed rather than abruptly, in particular, aiming to prevent stalling of the engine. This range in the normal control region where such moderate control (dashpot control) is to be made is especially called a dashpot control region (corresponding to about 4 to 2 degrees of the opening of the throttle valve). In the control in the valve closing direction, therefore, when the valve opening is gradually decreased in the normal control region and becomes less than about 4 degrees, it enters the dashpot control region for carrying out the dashpot control. After that, when the valve opening is moderately decreased in the dashpot control region and becomes less than about 2 degrees, it enters the ISC control region.

In the above control process, resolution of the throttle valve control less than 0.1 degree is required in the ISC control region for stably controlling the idling rotational speed. Resolution less than 0.1 degree is also required in the dashpot control region for moderately reducing the engine rotational speed. In view of the foregoing, this embodiment is arranged to perform high-resolution control using the opening sensor both in the ISC control region (from 0 degree (fully closed state) to about 2 degrees) and the dashpot control region (from about 2 degrees to about 4 degrees). Accordingly, the boundary opening at which two control modes are switched over is about 4 degrees.

Assuming now that an A/D converter of the host system 114 has resolution of 8 bits$=2^8=256$, for example, control resolution using the opening sensor is 4 degrees/256$=0.0156$ degree which satisfies the required resolution less than 0.1 degree.

However, when the opening control is performed near the boundary opening between the ISC control and the normal control, there is a fear that the control may be unstable because of frequent mode switching between the ISC control and the normal control. To eliminate such a fear, this embodiment is further arranged to set different boundary openings separately between the opening direction and the closing direction of the throttle valve, thereby providing a hysteresis in switching of the control mode.

Those two boundary openings for switching operation of the control mode will now be described with reference to FIG. 20.

Figure 20:
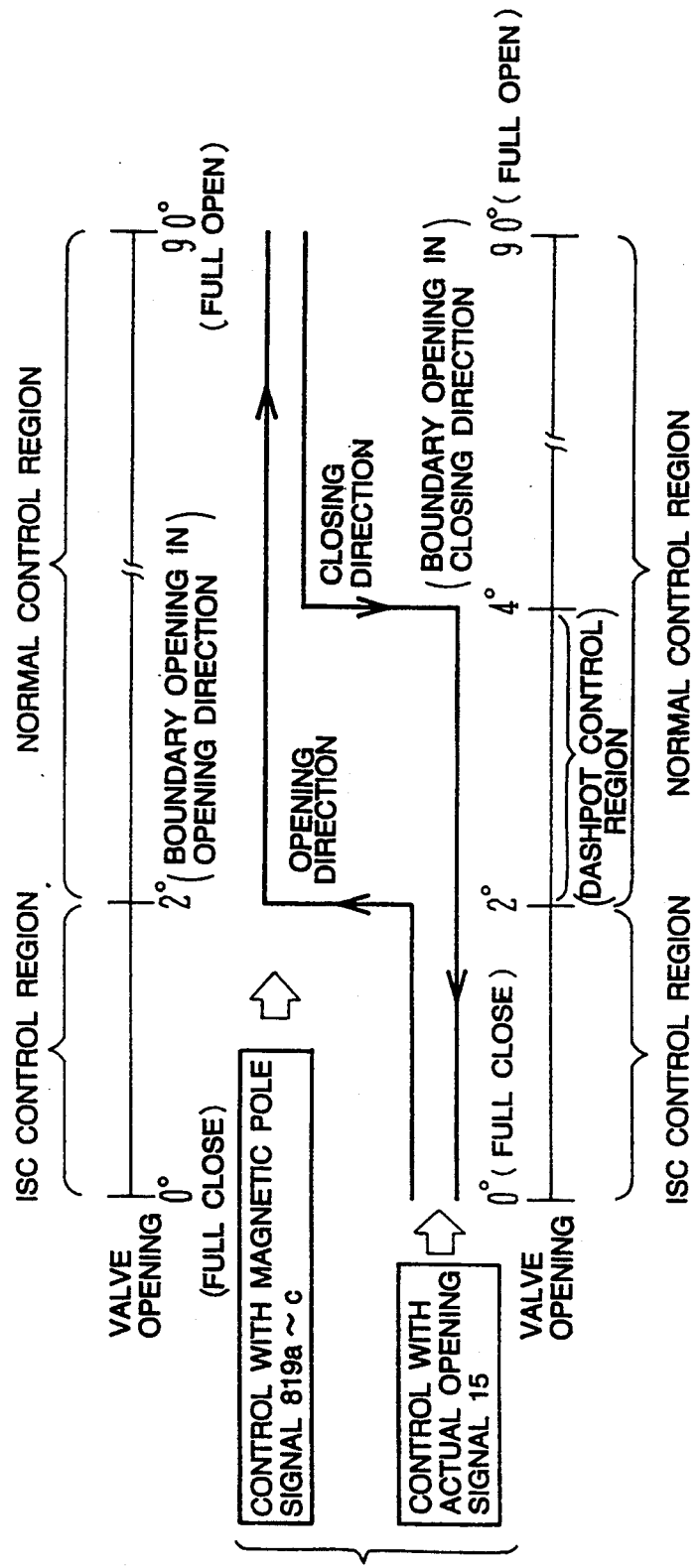
FIG. 20 is a timing chart showing two boundary openings for switching in control between ISC control and normal control.

In the electronic throttle system of this embodiment, as shown in FIG. 20, the boundary opening for the case that the control is proceeded in the opening direction of the throttle valve from the ISC control region (i.e., the boundary opening in the opening direction) is set to about 2 degrees. Then, as soon as the valve opening exceeds 2 degrees and leaves the ISC control region while performing the control based on the actual opening signal 15 from the opening sensor, the control mode is switched over to the control based on the magnetic pole sensor signals 819a to 819c from the magnetic pole sensors. Also, the boundary opening for the case that the control is proceeded conversely in the closing direction of the throttle valve from the normal control region (i.e., the boundary opening in the closing direction) is set to about 4 degrees. Then, as soon as the valve opening is reduced down less than 4 degrees and enters the dashpot control region while performing the control based on the magnetic pole sensor signals 819a to 819c from the magnetic pole sensors, the control mode is switched over to the control based on the actual opening signal 15 from the opening sensor.

By so setting the different boundary openings separately between when the engine rotational speed increases and when it decreases, namely, between the opening direction and the closing direction of the throttle valve, frequent control switching can be prevented to stabilize the opening control.

With this embodiment, as explained above, since the host system 114 as valve position control means performs position control of the throttle valve 102 based on the magnetic pole sensor signals 819a to 819c transmitted from the magnetic pole sensors 859 and the actual opening signal 15 transmitted from the opening sensor 103, large opening values which have been detected by an opening sensor in the prior art is detected by the magnetic pole sensors, and one opening sensor for the small opening range suffices in contrast with the prior art in which two opening sensors for the large and small opening ranges have been required. Therefore, it is possible to reduce the size and weight of the entire electronic throttle system, cut down the cost as a result of the reduced number of parts and further improve reliability. Additionally, since large opening values are measured by the magnetic pole sensors 859, the opening sensor 103 is only used to detect small opening values and can have improved resolution.

Moreover, since the magnetic pole sensor signals 819a to 819c and the actual opening signal 15 are switched over at a predetermined boundary opening to be selectively used, and the boundary opening is set to be different between the opening direction and the closing direction of the throttle valve, frequent control switching near the boundary opening at which the control mode is to be switched over can be prevented and the position control of the throttle valve 102 can be stabilized.

What is claimed is:
1. An electronic throttle system comprising:
an electronically controlled throttle actuator for controlling air intake, said electronically controlled throttle actuator including a throttle valve, a motor for generating torque to operate said throttle valve, gears for transmitting the torque generated by said motor, and a solenoid clutch for connecting and disconnecting transmission of the torque; and
control means for controlling said electronically controlled throttle actuator,
wherein said motor and said throttle valve are arrange into a U-shaped form for interconnection through said gears, said solenoid clutch is disposed on a shaft of said motor, the armature of said solenoid clutch is disposed on said shaft through rotary-sliding means which supports aid armature rotatable around said shaft and slidable in the direction of said shaft, and said armature rotates in a body with the rotor of said solenoid clutch fixed to said shaft in case of the coil of said solenoid clutch being excited.

2. An electronic throttle system according to claim 1, wherein said motor is of a brushless motor having a substantially semicircular cross-section comprising a portion generating torque and a flattened portion generating no torque and magnetic pole sensors for detecting positions of magnetic poles of said brushless motor are disposed in said flat portion.

3. An electronic throttle system according to claim 1, wherein a control circuit provided in said control means for controlling said motor is disposed in a case integrally molded with a case housing said motor therein.

4. An electronic throttle system according to claim 1, wherein a coil of said solenoid clutch is disposed concentrically with said shaft of motor.

5. An electronic throttle system according to claim 1, wherein said motor is disposed at a housing of said throttle valve so that said shaft of motor is located parallel to a shaft of said throttle valve.

6. An electronic throttle system according to claim 1, wherein a case housing of said motor is integrally molded with a housing of said throttle valve, and said throttle valve, said motor, said solenoid clutch, and said gears are disposed in a common housing which consists of a cover of said gears and said housing of throttle valve.

7. An electronic throttle system according to claim 6, wherein said electronic throttle system further comprises a opening sensor for detecting opening of said throttle valve, said opening sensor being disposed at said cover of gears in the face of said shaft of throttle valve and detecting the rotation of said shaft of throttle valve directly.

* * * * *